(12) United States Patent
Geng et al.

(10) Patent No.: US 11,893,016 B1
(45) Date of Patent: Feb. 6, 2024

(54) SECURE PREDICATE DERIVATION OF QUERIES USING METADATA

(71) Applicant: Snowflake Inc., Bozeman, MT (US)

(72) Inventors: Zixuan Geng, Bellevue, WA (US); Sangyong Hwang, Sammamish, WA (US); Nitish Jindal, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/049,904

(22) Filed: Oct. 26, 2022

(51) Int. Cl.
*G06F 16/24* (2019.01)
*G06F 16/2453* (2019.01)

(52) U.S. Cl.
CPC .. *G06F 16/24542* (2019.01); *G06F 16/24537* (2019.01)

(58) Field of Classification Search
CPC ............... G06F 16/24542; G06F 16/24537
See application file for complete search history.

(56) References Cited

U.S. PATENT DOCUMENTS

| | | | | |
|---|---|---|---|---|
| 11,036,738 B1* | 6/2021 | Adams | ............... | G06F 16/24544 |
| 11,036,739 B1* | 6/2021 | Adams | ............... | G06F 16/24544 |
| 11,100,105 B1* | 8/2021 | Adams | ............... | G06F 16/24544 |
| 2011/0029508 A1* | 2/2011 | Al-Omari | ......... | G06F 16/24542 |
| | | | | 707/718 |
| 2015/0370853 A1* | 12/2015 | Lee | ..................... | G06F 16/2453 |
| | | | | 707/718 |
| 2018/0285415 A1* | 10/2018 | Beavin | ............... | G06F 16/24537 |
| 2019/0073195 A1* | 3/2019 | Arnold | ................... | G06N 20/10 |
| 2019/0220464 A1* | 7/2019 | Butani | .................. | G06F 16/283 |
| 2020/0117664 A1* | 4/2020 | Kondiles | ............. | G06F 12/0893 |
| 2021/0124743 A1* | 4/2021 | Choi | .................... | G06F 16/2246 |
| 2021/0240727 A1* | 8/2021 | Hoang | ................... | G06N 20/00 |
| 2021/0311945 A1* | 10/2021 | Sun | ....................... | G06F 16/282 |
| 2022/0121711 A1* | 4/2022 | Arnold | ............... | G06F 16/24542 |
| 2022/0179854 A1* | 6/2022 | Sharique | ........... | G06F 16/24544 |
| 2023/0107652 A1* | 4/2023 | Veselova | ........... | G06F 16/24552 |
| | | | | 707/769 |

\* cited by examiner

*Primary Examiner* — Mohammad S Rostami
(74) *Attorney, Agent, or Firm* — Schwegman Lundberg & Woessner, P.A.

(57) ABSTRACT

The subject technology provides embodiments for enabling derivation of predicates not only from other predicates but also from metadata such as expression properties. In examples, predicates are derived, avoiding unwanted impact on cardinality estimation. In other examples, predicates are derived, avoiding artificial runtime errors and providing a way to avoid security issues with secure views.

30 Claims, 23 Drawing Sheets

SECURE PREDICATE DERIVATION OF QUERIES USING METADATA

TECHNICAL FIELD

The present disclosure relates systems, methods, and devices for databases and more particularly relates to optimizations for executing database queries.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
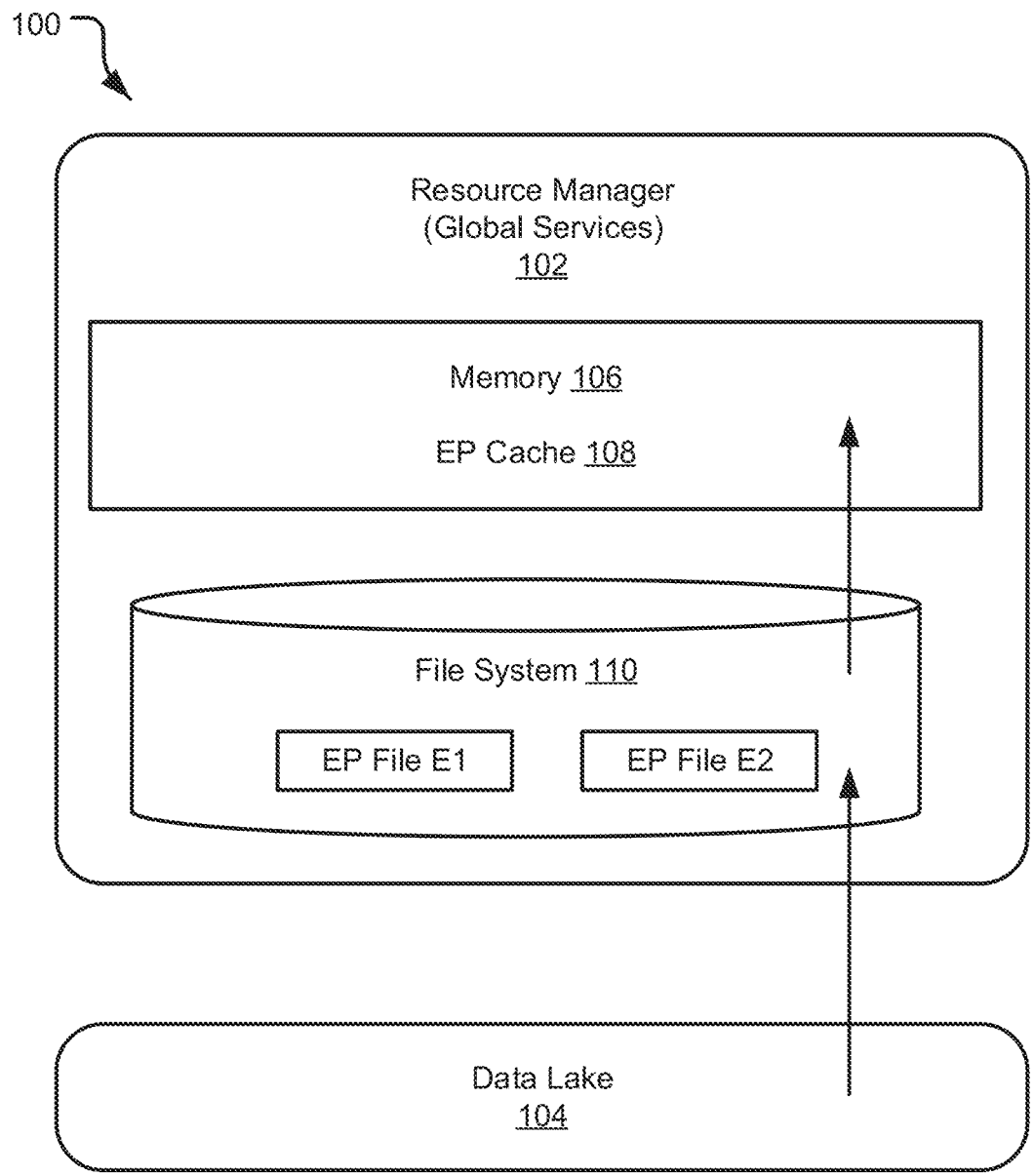
FIG. 1 is a block diagram illustrating a system of ingesting data into a database and generating metadata on the data, according to an example embodiment of the systems and methods described herein.

The present disclosure is directed to systems, methods, and devices for predicate derivation, and more specifically creating new predicates based on existing predicates.

As an initial discussion, database systems store and maintain large amounts of metadata. This metadata describes the data that is stored in database tables of customers but is not actually the stored table data. Metadata can get very large, especially if there are large database tables of many customers. Current database systems have severe limitations handling large amounts of metadata.

In an embodiment, a system includes a plurality of shared storage devices collectively storing database data across a plurality of tables that each comprise one or more micro-partitions constituting immutable storage devices that cannot be updated in-place. The system includes a resource manager configured to manage the storage of database data stored in a table across one or more of the plurality of shared storage devices. The resource manager is configured to manage the storage of metadata for the table. The metadata includes a column expression property with information about data stored in a column, a micro-partition expression property with information about data stored in a micro-partition, a grouping expression property with information about data stored in two or more micro-partitions, and cumulative table metadata with global information about all micro-partitions of the table.

The disclosure describes, in part, the organization of metadata that includes information about tables in a database. A table of a database may include many rows and columns of data. One table may include millions of rows of data and may be very large and difficult to store or read. A very large table may be divided into multiple smaller files which may be referred to herein as "micro-partitions." For example, one table may be divided into six distinct micro-partitions, and each of the six micro-partitions may include a portion of the data in the table. Dividing the table data into multiple micro-partitions helps to organize the data and to find where certain data is located within the table.

An analogy to the micro-partitions of the table may be different storage buildings within a storage compound. In the analogy, the storage compound is similar to the table, and each separate storage building is similar to a micro-partition. Hundreds of thousands of items are stored throughout the storage compound. Because so many items are located at the storage compound, it is necessary to organize the items across the multiple separate storage buildings. The items may be organized across the multiple separate storage buildings by any means that makes sense. For example, one storage building may store clothing, another storage building may store household goods, another storage building may store toys, and so forth. Each storage building may be labeled so that the items are easier to find. For example, if a person wants to find a stuffed bear, the person will know to go to the storage building that stores toys. The storage building that stores toys may further be organized into rows of shelving. The toy storage building may be organized so that all stuffed animals are located on one row of shelving. Therefore, the person looking for the stuffed bear may know to visit the building that stores toys and may know to visit the row that stores stuffed animals. Further to the analogy with database technology, each row of shelving in the storage building of the storage compound may be similar to a column of database data within a micro-partition of the table. The labels for each storage building and for each row of shelving are similar to metadata in a database context.

Similar to the analogy of the storage compound, the micro-partitions disclosed herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data. For example, if the database client is a credit card provider and the data is credit card transactions. The table may include columns such as credit card number, account member name, merchant name, date of card transaction, time of card transaction, type of goods or services purchased with card, and so forth. The table may include millions and millions of credit card transactions spanning a significant time period, and each credit card transaction may be stored in one row of the table. Because the table includes so many millions of rows, the table may be partitioned into micro-partitions. In the case of credit card transactions, it may be beneficial to split the table based on time. For example, each micro-partition may represent one day or one week of credit card transactions. It should be appreciated that the table may be partitioned into micro-partitions by any means that makes sense for the database client and for the type of data stored in the table. The micro-partitions provide significant benefits for managing the storage of the millions of rows of data in the table, and for finding certain information in the table.

A query may be executed on a database table to find certain information within the table. Further to the above example of the credit card transactions, a query may seek to find all transactions for a certain vendor across a certain time period. For example, a database client (in this case, the credit card provider) may query its database and ask for a report of all credit transactions that occurred at Retail Store A in the months of January, April, and May. To respond to the query, a resource manager (see 102) must scan the table to find each of the applicable credit card transactions. The table may include millions and millions of rows, and it would be very time consuming and it would require significant computing resources for the resource manager to scan the entire table. The micro-partition organization along with the systems, methods, and devices for database metadata storage as disclosed herein provide significant benefits by shortening the query response time and reducing the amount of computing resources that are required for responding to the query.

Further to the above example, the resource manager must respond to the query that requested all credit card transactions at Retail Store A in the months of January, April, and May. The resource manager may find the cells of database data by scanning database metadata. The multiple level database metadata as described herein (see e.g. FIG. 3) enables the resource manager to quickly and efficiently find the correct data to respond to the query. The resource manager may find the correct table by scanning table metadata (see 302) across all the multiple tables in the client's database. The resource manager may find a correct grouping of micro-partitions by scanning multiple grouping expression properties (see 314a-314d) across the identified table. The grouping expression properties 314a-314d include information about database data stored in each of the micro-partitions within the grouping. The resource manager may find a correct micro-partition by scanning multiple micro-partition expression properties within the identified grouping of micro-partitions. The resource manager may find a correct column by scanning one or more column expression properties within the identified micro-partition. The resource manager may find the correct row(s) by scanning the identified column within the identified micro-partition. Further to the example involving the credit card transactions, the resource manager may scan multiple tables to find a table that includes credit card transactions. The resource manager may scan the grouping expression properties to find groupings that have data for the months of January, April, and/or May. For example, the resource manager finds a grouping that includes credit card transactions for the month of January. The resource manager reads the micro-partition expression properties for that grouping to find one or more individual micro-partitions that include transactions for the month of January. The resource manager reads column expression properties within each of the identified individual micro-partitions. The resource manager scans the identified columns to find the applicable rows that have a credit card transaction for Retail Store A in the month of January (or April or May).

The unique metadata organization structures used herein may be applied to database "pruning" based on the metadata. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. Further to the above example, the resource manager must respond to the query that requested all credit card transactions at Retail Store A in the months of January, April, and May. Pruning based on metadata would include scanning the metadata to determine which micro-partitions or groupings of micro-partitions included credit card transactions at Retail Store A in the months of January, April, and/or May. The pruning results in finely selecting only the relevant micro-partitions and disregarding all non-relevant micro-partitions. In some instances, the non-relevant micro-partitions may number in the millions or even hundreds of millions. By pruning the table based on the metadata, the system can save significant time and resources by avoiding all non-relevant micro-partitions when responding to the query. After pruning, the system will scan the relevant micro-partitions and select all rows that include a credit card transaction at Retail Store A in January, April, or May.

As illustrated in the above example, the metadata organization as disclosed herein provides significant benefits to hasten the query response time and enable the resource manager to quickly identify the correct table, the correct grouping of micro-partitions, the correct micro-partition, the correct column, and the correct row to respond to a query. The novel metadata storage as disclosed herein provides a multiple level metadata data structure for maintaining information about micro-partitions in a table of a database.

To provide further background to the disclosures provided herein, a database table is a collection of related data held in a structured format within the database and may include columns and rows. A database table may be altered in response to a data manipulation (DML) command such as an insert command, a delete command, an update command, a merge command, and so forth. Such modifications may be referred to as a transaction that occurred on the database table. In an embodiment, each transaction includes a timestamp indicating when the transaction was received and/or when the transaction was fully executed. In an embodiment, a transaction includes multiple alterations made to a table, and such alterations may impact one or more micro-partitions in the table. In an embodiment, data may be continuously ingested, or may be ingested at determined time intervals, and the ingestion of data into the database is a transaction occurring on the database. In an embodiment, each time a transaction is executed on the table, a new table version is generated that includes one or more new micro-partitions. Further, each time a transaction is executed on the table, or after a threshold number of transactions are executed on the table, the metadata for the table may need to be updated to reflect the new data stored in the table.

A database table may store data in a plurality of micro-partitions, wherein the micro-partitions are immutable storage devices. When a transaction is executed on such a table, all impacted micro-partitions are recreated to generate new micro-partitions that reflect the modifications of the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, updates, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for updating table metadata after one or more changes (transactions) have occurred on the table.

In one embodiment, metadata is stored and maintained on non-mutable storage services (may be referred to herein as micro-partitions) in the cloud. These storage services may include, for example, Amazon S3 ®, Microsoft Azure Blob Storage®, and Google Cloud Storage®. Many of these services do not allow to update data in-place (i.e., are non-mutable or immutable). Data micro-partitions may only be added or deleted, but never updated. In one embodiment, storing and maintaining metadata on these services requires that, for every change in metadata, a metadata micro-partition is added to the storage service. These metadata micro-partitions may be periodically consolidated into larger "compacted" or consolidated metadata micro-partitions in the background.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata. Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Current database systems store metadata in mutable storage devices and services, including main memory, micro-partition systems, and key-value stores. These devices and services allow the metadata to be updated in-place. If a data record changes, it may be updated with the new information. The old information is overwritten. This allows databases to easily maintain mutable metadata by updating metadata in-place. However, these storage devices and services have limitations. The limitations are at least two-fold. First, mutable storage devices like main memory and micro-partition systems have a hard limit in terms of storage capacity. If the size of the metadata exceeds these limits, it is impossible to store more metadata there. Second, mutable storage services like key-value stores perform poorly when reading large volumes of metadata. Reading data is performed using range scans, which take a long time to finish. In practice, range scans can take many minutes or even approach an hour to complete in large scale deployments.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Disclosed herein are systems and methods for improved metadata storage and management that include storing metadata in immutable (non-mutable) storage in a multi-level storage architecture. In an embodiment, a system includes means for storing data in a table of a database, wherein the table includes one or more micro-partitions each having rows and columns. The system includes means for storing table metadata. The table metadata includes a cumulative expression property including global information about a plurality of expression properties. The table metadata includes the plurality of expression properties that are associated with the cumulative expression property, and each of the plurality of expression properties includes information about one or more columns stored within a micro-partition of the one or more micro-partitions of the database.

An expression property is some information about the one or more columns stored within one or more micro-partitions. In an embodiment, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and so forth.

A cumulative expression property includes global information about data stored in a plurality of expression properties. Similar to the expression property, the cumulative expression property includes any suitable information about database data and/or the database itself. The cumulative expression property may store a summary of the information stored within the plurality of expression properties to which it is associated. In an embodiment, the cumulative expression property includes one or more of: a summary of the data stored across each of one or more micro-partitions of a table, a type of data stored in one or more columns across each of one or more micro-partitions of a table, a global minimum and maximum for data stored across each of one or more micro-partitions of a table, and so forth.

As used herein, immutable or non-mutable storage includes storage where data cannot, or is not permitted, to be overwritten or updated in-place. For example, changes to data that is located in a cell or region of storage media may be stored as a new micro-partition in a different, time-stamped, cell or region of the storage media. Mutable storage may include storage where data is or permitted to be overwritten or updated in place. For example, data in a given cell or region of the storage media can be overwritten when there are changes to the data relevant to that cell or region of the storage media.

In one embodiment, metadata is stored and maintained on non-mutable storage services in the cloud. These storage services may include, for example, Amazon S3 ®, Microsoft Azure Blob Storage®, and Google Cloud Storage®. Many of these services do not allow to update data in-place (i.e., are non-mutable or immutable). Data micro-partitions may only be added or deleted, but never updated. In one embodiment, storing and maintaining metadata on these services requires that, for every change in metadata, a metadata micro-partition is added to the storage service. These metadata micro-partitions may be periodically consolidated into larger "compacted" or consolidated metadata micro-partitions in the background. A metadata micro-partition version may be stored to indicate metadata micro-partitions that correspond to the compacted or consolidated version versus the pre-compaction or pre-consolidation version of metadata micro-partitions. In one embodiment, consolidation of mutable metadata in the background to create new versions of metadata micro-partitions may allow for deletions of old metadata micro-partitions and old data micro-partitions.

By using immutable storage, such as cloud storage, embodiments allow storage capacity to not have a hard limit. Using storage services in the cloud allows for virtually unlimited amounts of metadata. Reading large amounts of metadata may be much faster because metadata micro-partitions may be downloaded in parallel, including prefetching of micro-partitions. Metadata micro-partitions may also be cached on a local micro-partition system so that they are not downloaded more than once. In practical usage scenarios and testing, the systems and methods as disclosed herein can provide a 200-fold performance improvement when reading metadata from storage services in the cloud when compared to reading the same metadata information from mutable storage like a key-value store.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Now turning to the figures, FIG. 1 is a schematic diagram of system 100 for ingesting data into a database and generating metadata on the data. The system 100 includes a resource manager 102 (may alternatively be referred to as global services) and constitutes a database services manager. The resource manager 102 includes memory 106 and an EP (expression property) cache 108. The EP cache 108 is cache storage for storing metadata about database data that is managed and executed upon by the resource manager 102 and stored in a file system 110. The resource manager 102 is further in communication with a file system 110 that may include a plurality of shared storage devices collectively storing database data and metadata pertaining to the database data. The file system 110 includes EP files (expression property files), wherein each of the EP files store a collection of expression properties about corresponding data. The EP files illustrated in FIG. 1 include the example EP file E1 and EP file E2. The system 100 may ingest data from a data lake 104, such as cloud service provider. In an embodiment, the EP files are determined at the data lake 104 level and are ingested into the file system 110 predetermined. In an alternative embodiment, database data is ingested at the data lake 104 and the EP files are determined by the resource manager 102. In an embodiment, the resource manager 102 generates metadata as described further herein. Specifically, the resource manager include a background service that performs consolidation, or compaction, which can also generate compacted EP files, as well as 2-level EP files as described further herein.

Figure 2:
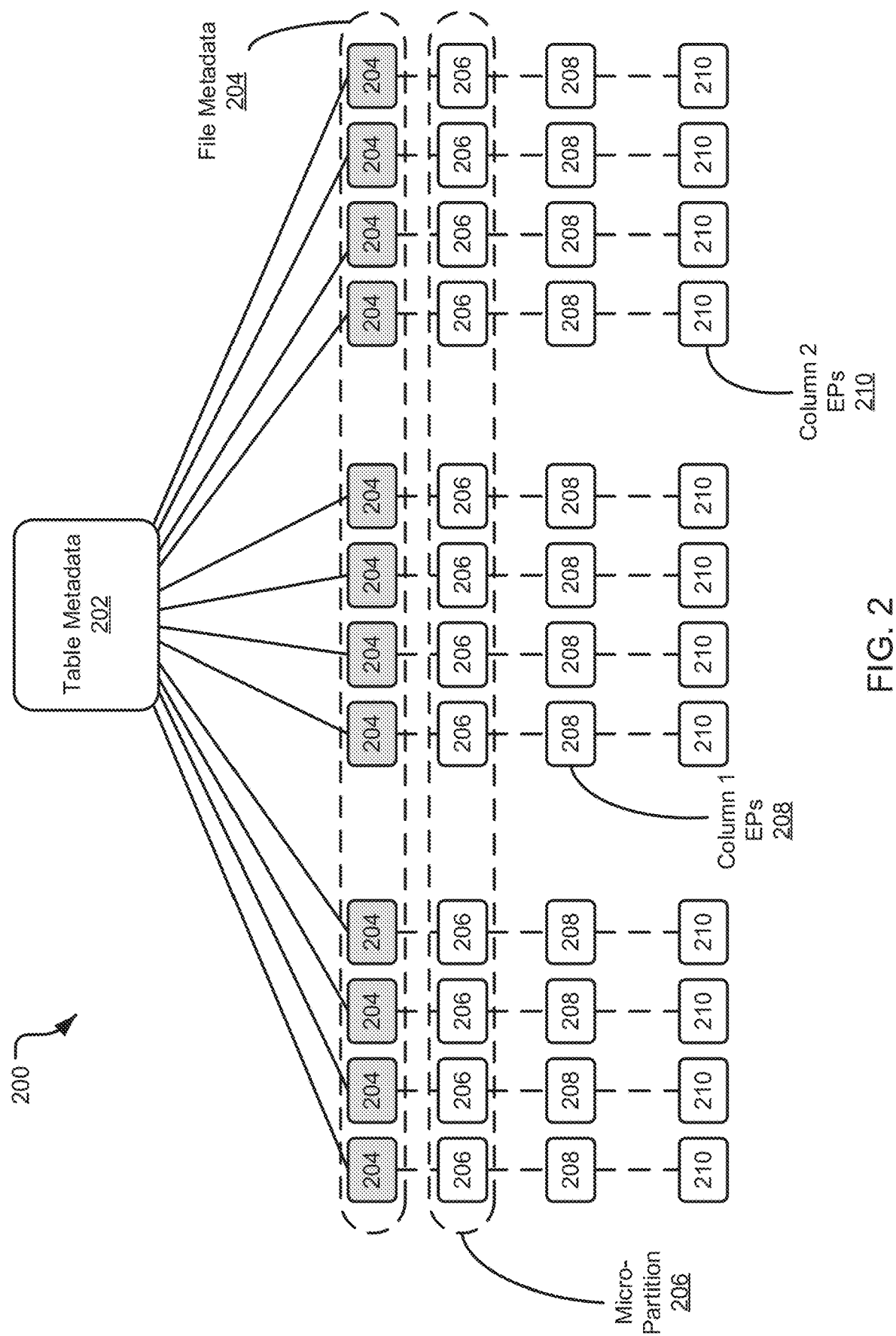
FIG. 2 is a block diagram of a system for storage of database metadata, according to an example embodiment of the systems and methods described herein.

FIG. 2 is a schematic diagram of a data structure 200 for storage of database metadata. The data structure 200 may be constructed from metadata micro-partitions as described in FIG. 10 and may be stored in a metadata cache memory. The data structure 200 includes table metadata 202 pertaining to database data stored across a table of the database. The table may be composed of multiple micro-partitions serving as immutable storage devices that cannot be updated in-place. Each of the multiple micro-partitions may include numerous rows and columns making up cells of database data. The table metadata 202 may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

The table metadata 202 includes global information about the table of a specific version. The data structure 200 further includes file metadata 204 that includes metadata about a micro-partition of the table. The terms file and micro-partition may each refer to a subset of database data and may be used interchangeably in some embodiments. The file metadata 204 includes information about a micro-partition 206 of the table. The micro-partition 206 illustrated in FIG. 2 includes database data and is not part of the metadata storage. Further, metadata may be stored for each column of each micro-partition 206 of the table. The metadata pertaining to a column of a micro-partition 206 may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition 206 of the table may include one or more expression properties. As illustrated in the exemplary embodiment shown in FIG. 1, the table metadata 202 includes expression properties for column 1 of a micro-partition 206 at 208 and expression properties for column 2 of a micro-partition 206 at 210. It should be appreciated that the table may include any number of micro-partitions, and each micro-partition may include any number of columns. The micro-partitions may have the same or different columns and may have different types of columns storing different information.

Figure 3:
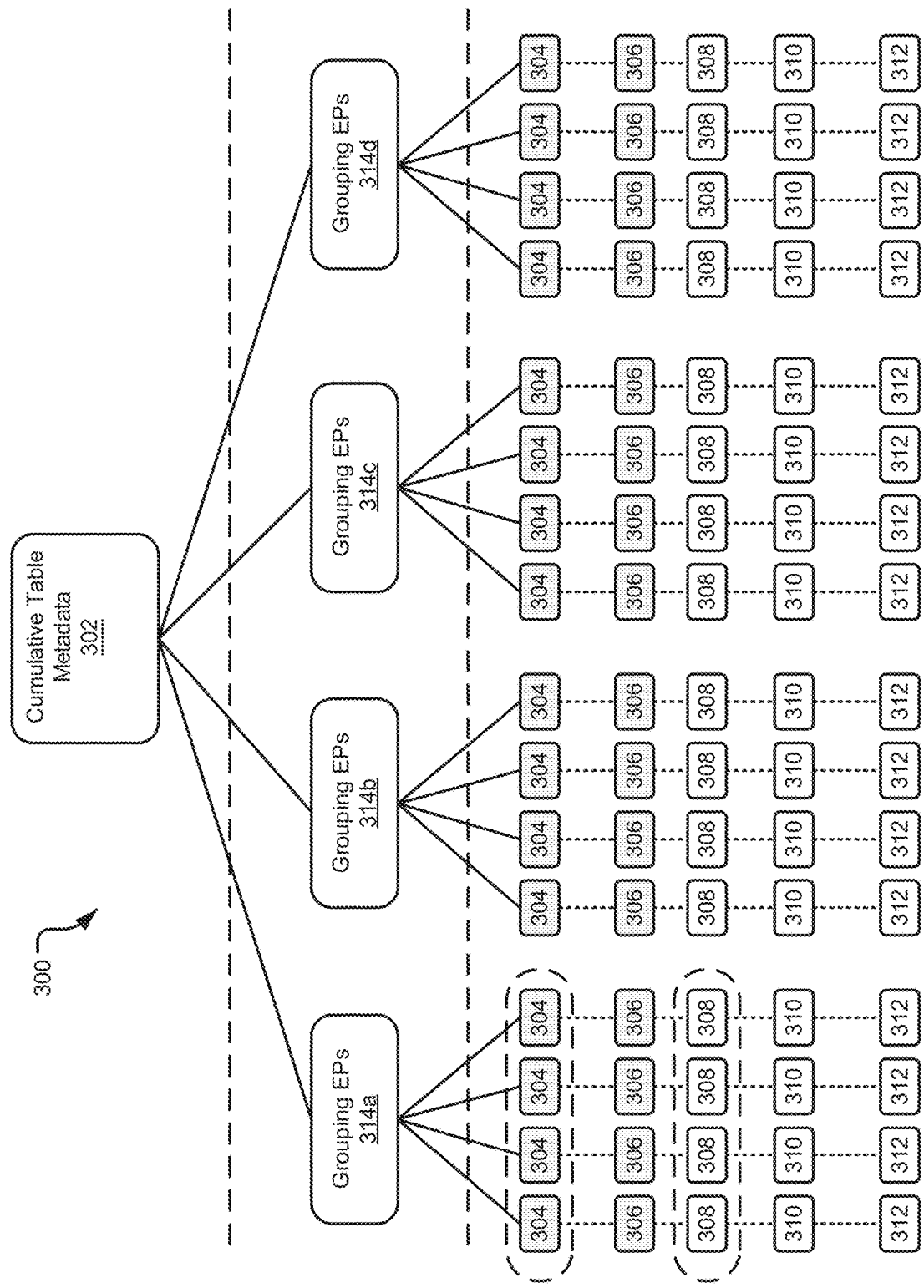
FIG. 3 is a block diagram of a system for storage of database metadata, according to an example embodiment of the systems and methods described herein.

FIG. 3 is a schematic diagram of a data structure 300 for storage of database metadata, including in persistent storage and cache storage. The data structure 300 includes cumulative table metadata 302 including information about a table of the database. The table may include a plurality of files or micro-partitions that may each include a number of columns and rows storing database data. The cumulative table metadata 302 includes global information about the table and may include summary information stored in each of a plurality of grouping expression properties 314a, 314b, 314c, and 314d (may be collectively referenced herein as "314"). The grouping expression properties 314a-314d include aggregated micro-partition statistics, cumulative column properties, and so forth about a micro-partition 306 or a collection of micro-partitions of the table. It should be appreciated that the micro-partitions 306 illustrated in FIG. 3 may each contain a different subset of the data stored in the table and may include the same columns or may include different columns storing different types of information. The micro-partitions 306 of the table each include one or more columns and may each have the same types of columns or different types of columns. An expression property may be stored for each column of each micro-partition 306 of the table, or for a collection of micro-partitions 306 of the table as illustrated in FIG. 3. The data structure 300 includes micro-partition statistics 304 for each micro-partition 306 of the table (the micro-partition statistics 304 may alternatively be referred to herein as "micro-partition expression properties"). The micro-partition statistics 304 may include a minimum/maximum data point for the corresponding micro-partition 306, a type of data stored in the corresponding micro-partition, a micro-partition structure of the corresponding micro-partition 306, and so forth. As illustrated in FIG. 3, a column 1 expression property 308 is stored for the first column in each of the different micro-partitions 306. Further, a column 2 expression property 310 is stored for the second column in each of the different micro-partitions 306. Further, a column 3 expression property 312 is stored for the third column in each of the different micro-partitions. It should be appreciated that each of the micro-partitions may include any suitable number of columns, and that an expression property may be stored for each of the columns, or for any suitable number of the columns, stored in each micro-partition of the table. The column 1 expression properties 308, the column 2 expression properties 310, and the column 3 expression properties 312, along with any additional column expression properties that may be included as deemed appropriate, may be stored as part of a metadata micro-partition. A metadata micro-partition may be persisted in immutable storage and the grouping expression properties 314a-314d may also be stored within a metadata micro-partition in immutable storage. A metadata manager may maintain all metadata micro-partitions, including metadata micro-partitions comprising the grouping expression properties 314a-314d, and micro-partition statistics 304, and/or the column expression properties 308-312.

The cumulative table metadata 302 includes global information about all micro-partitions within the applicable table. For example, the cumulative table metadata 302 may include a global minimum and global maximum for the entire table, which may include millions or even hundreds of millions of micro-partitions. The cumulative table metadata 302 may include any suitable information about the data stored in the table, including, for example, minimum/maximum values, null count, a summary of the database data collectively stored across the table, a type of data stored across the table, a distinct for the data stored in the table, and so forth.

The grouping expression properties 314a-314d include information about database data stored in an associated grouping of micro-partitions. For example, an example grouping expression property is associated with micro-partitions numbered 3040 thru 3090 such that the example grouping expression property is associated with fifty different micro-partitions. The example grouping expression property includes information about those fifty different micro-partitions. One grouping expression property of the grouping expression properties 314a-314d may include any suitable information about the micro-partitions with which it is associated. For example, a grouping expression property may include a global minimum/maximum for the collective set of micro-partitions, a minimum/maximum for each of the micro-partitions within the grouping, a global null count, a null count for each of the micro-partitions within the grouping, a global summary of data collectively stored across the grouping of micro-partitions, a summary of data stored in each of the micro-partitions in the grouping, and so forth. The grouping expression property may include global information for all micro-partitions within the grouping of micro-partitions that is associated with the grouping expression property, and it may further include information specific to each of the micro-partitions within the associated grouping.

The metadata structure disclosed in FIG. 3 provides increased granularity in cumulative table metadata 302 over other embodiments such as the embodiment illustrated in FIG. 2. The grouping expression properties provide valuable global metadata pertaining to a collection of micro-partitions 306 of the database. Further, each of the columnar expression properties 308, 310, 312 provide valuable information about a column of a micro-partition 306 of the table.

The metadata structures disclosed herein, including the data structure 300 shown in FIG. 3, increases efficiency when responding to database queries. A database query may request any collection of data from the database and may be used for creating advanced analyses and metrics about the database data. Some queries, particularly for a very large database, can be extremely costly to run both in time and computing resources. When it is necessary to scan metadata and/or database data for each file or micro-partition of each table of a database, it can take many minutes or even hours to respond to a query. In certain implementations this may not be an acceptable use of computing resources. The data structure 300 disclosed herein provides increased metadata granularity and enables multi-level pruning of database data. During compilation and optimization of a query on the database, a processor may scan the cumulative table metadata 302 to determine if the table includes information pertaining to the query. In response to determining, based on the cumulative table metadata 302, that the table includes information pertaining to the query, the processor may scan each of the grouping expression properties 314a-314d to determine which grouping of micro-partitions of the table include information pertaining to the query. In response to determining, based on a first cumulative expression property, that a first grouping of micro-partitions does not include information pertaining to the query, the processor may discontinue database scanning of that first grouping of micro-partitions. In response to determining, based on a second cumulative expression property, that a second grouping of micro-partitions includes information pertaining to the query, the processor may proceed to scan expression properties for that second grouping of micro-partitions. The processor may efficiently determine which micro-partitions include pertinent data and which columns of which micro-partitions include pertinent data. The processor may proceed to scan only the relevant column(s) and micro-partition(s) that include information relevant to a database query. This provides a cost efficient means for responding to a database query by way of multi-level pruning based on multi-level table metadata.

Further to increase the cost efficiency of database queries, a resource manager (may also be referred to as a "global services") may store the cumulative table metadata 302 in a cache for faster retrieval. Metadata for the database may be stored in a metadata store separate and independent of a plurality of shared storage devices collectively storing database data. In a different embodiment, metadata for the database may be stored within the plurality of shared storage devices collectively storing database data. In various embodiments, metadata may be stored in metadata-specific micro-partitions that do not include database data, and/or may be stored within micro-partitions that also include database data. The metadata may be stored across disk storage, such as the plurality of shared storage devices, and it may also be stored in cache within the resource manager.

Figure 4A:
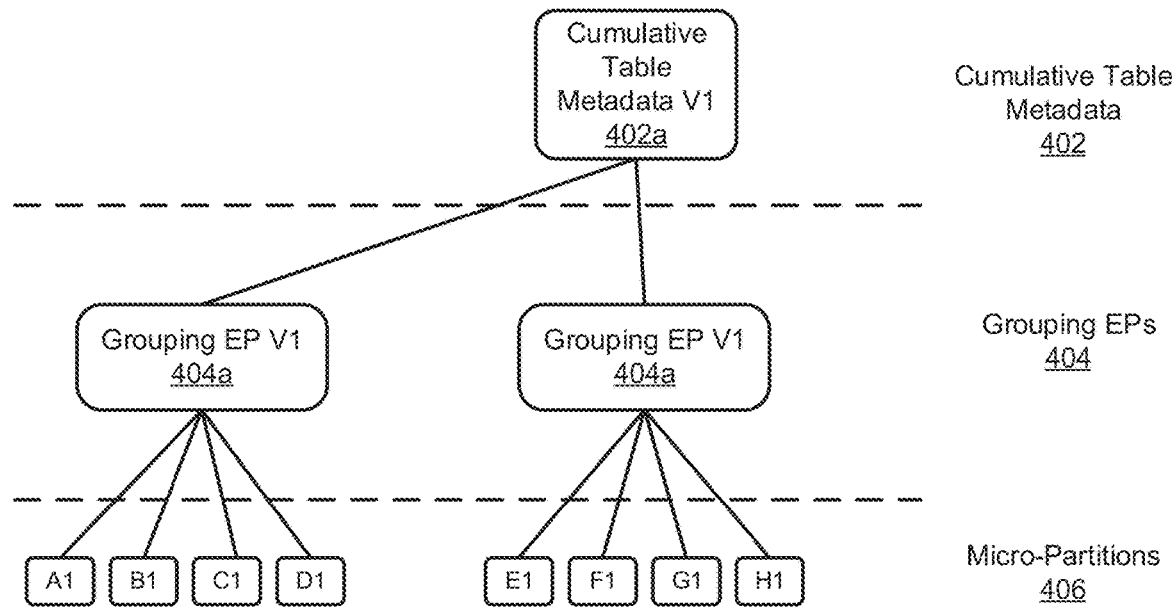
FIG. 4A, FIG. 4B, and FIG. 4C are block diagrams illustrating the generation of table metadata across multiple versions of a table of a database, according to an example embodiment of the systems and methods described herein.
Figure 4B:
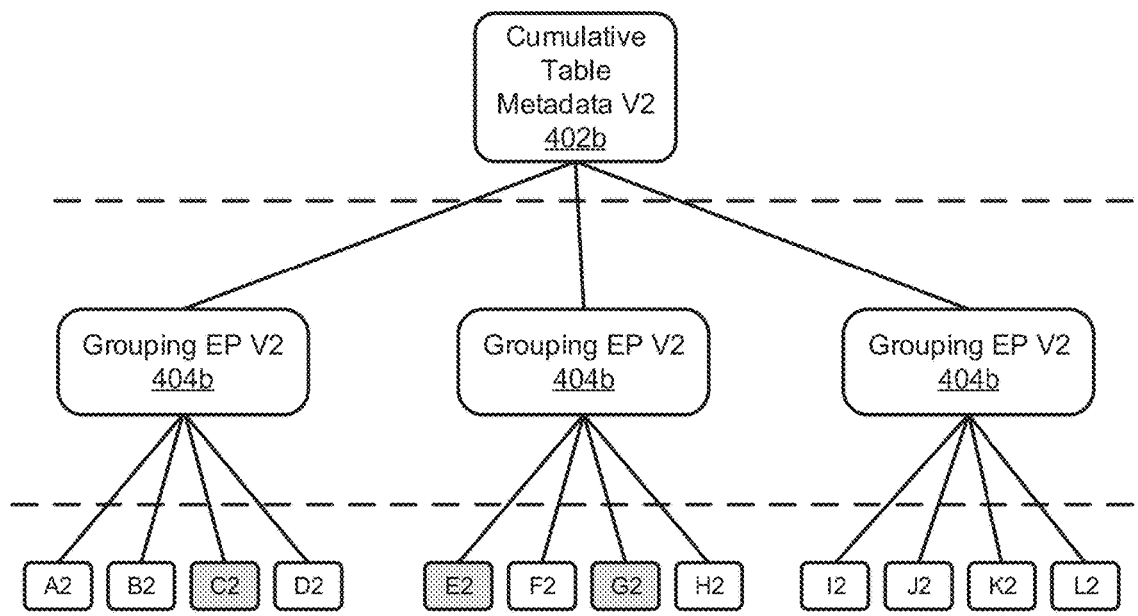
Figure 4C:
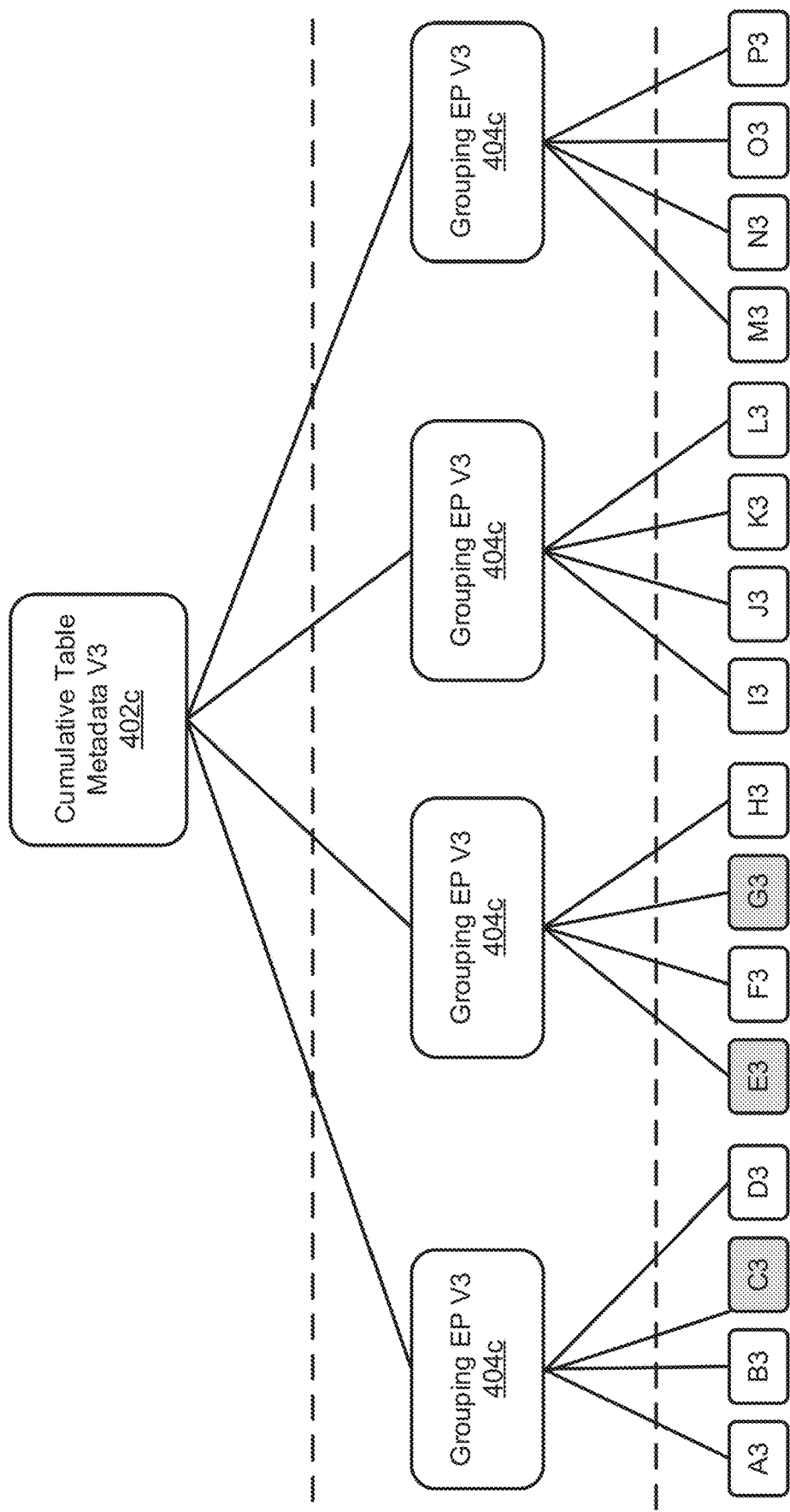

FIGS. 4A-4C illustrate the generation of cumulative table metadata 402 across multiple versions of a table of a database. The metadata structure depicted in FIGS. 4A-4C follows the data structure 300 disclosed in FIG. 3. Accordingly, there is cumulative table metadata 402 including global information about the table, along with grouping expression properties 404 for each grouping of table micro-partitions. Further, the table includes a plurality of micro-partitions each serving as an immutable storage device for storing database data that cannot be updated in-place.

FIG. 4A illustrates metadata for a first version (V1) of the table. The table has version one cumulative table metadata 402a and version one grouping expression properties 404a each including global information about a grouping of micro-partitions 406 of the table. Version 1 of the micro-partitions, including A1, B1, C1, D1, E1, F1, G1, and H1 are illustrated in FIG. 4A. The table includes a plurality of micro-partitions each storing a subset of the database data in the table.

FIG. 4B illustrates metadata for a second version (V2) of the table that includes a second version of the micro-partitions, including A2, B2, C2, D2, E2, F2, G2, H2, I2, J2, K2, and L2. The greyed micro-partitions (C2, E2, and G2) illustrate micro-partitions that were deleted by a transaction execution on the table. The new micro-partitions (I2, J2, K2, and L2) illustrate micro-partitions that were added to the table by a transaction that was executed on the table. The non-greyed existing micro-partitions (A2, B2, D2, F2, and H2) illustrate micro-partitions that were not modified by any transaction executed on the table. As shown in FIG. 4B, a version two cumulative table metadata 402b is generated in response to a new version of the table being generated by one or more transactions being executed on the table. Further, new version two grouping expression properties 404b are generated in response to the new version of the table being generated by the one or more transactions executed on the table. In an embodiment, when micro-partitions are deleted from a grouping of micro-partitions, but no new micro-partitions were added to the grouping, the grouping expression properties 404b may not need to be recomputed. The minimum value, maximum value, number of nulls, and number of distinct values may now be over-estimated, but may still be considered safe by the database client. The overestimated values may lead an optimizer to suboptimal decisions but not to wrong query results. In this embodiment, the grouping expression properties 404b may still be recomputed for the sake of optimizer efficiency. In the example illustrated in FIG. 4B, after micro-partitions C2, E2, and G2 are deleted, the existing grouping expression properties 404b for the first and second grouping are still safe to use. These grouping expression properties 404b may not be recomputed or may be recomputed in a later phase. For each new version of the table, the grouping expression properties may be computed for groupings of newly added micro-partitions, and this may lead to efficient calculation of global grouping expression properties. Each of the micro-partitions 406 of the table constitutes an immutable storage device that cannot be updated in-place. Therefore, in response to a transaction being executed on the table, such as a DML command, a new micro-partition is generated to reflect the transaction and replace the prior micro-partition.

FIG. 4C illustrates metadata for a third version (V3) of the table. As illustrated, new micro-partitions have been added to the table in version three, including micro-partitions M3, N3, O3, and P3. An updated version three cumulative table metadata 402c provides global information about the table, and updated version three grouping expression properties 404c each provide global information about their associated groupings of version three micro-partitions.

Figure 5:
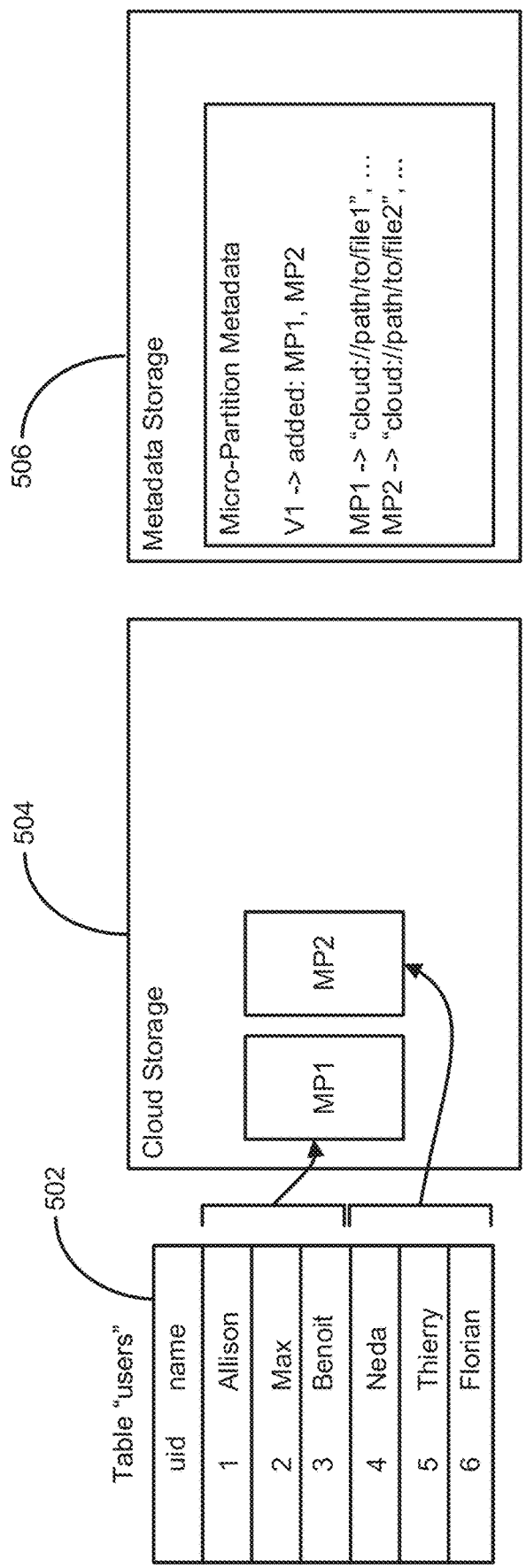
FIGS. 5-7 are block diagrams of an example operation of a database system when table data is stored in immutable storage and metadata is stored in mutable storage, according to an example embodiment of the systems and methods described herein.
Figure 6:
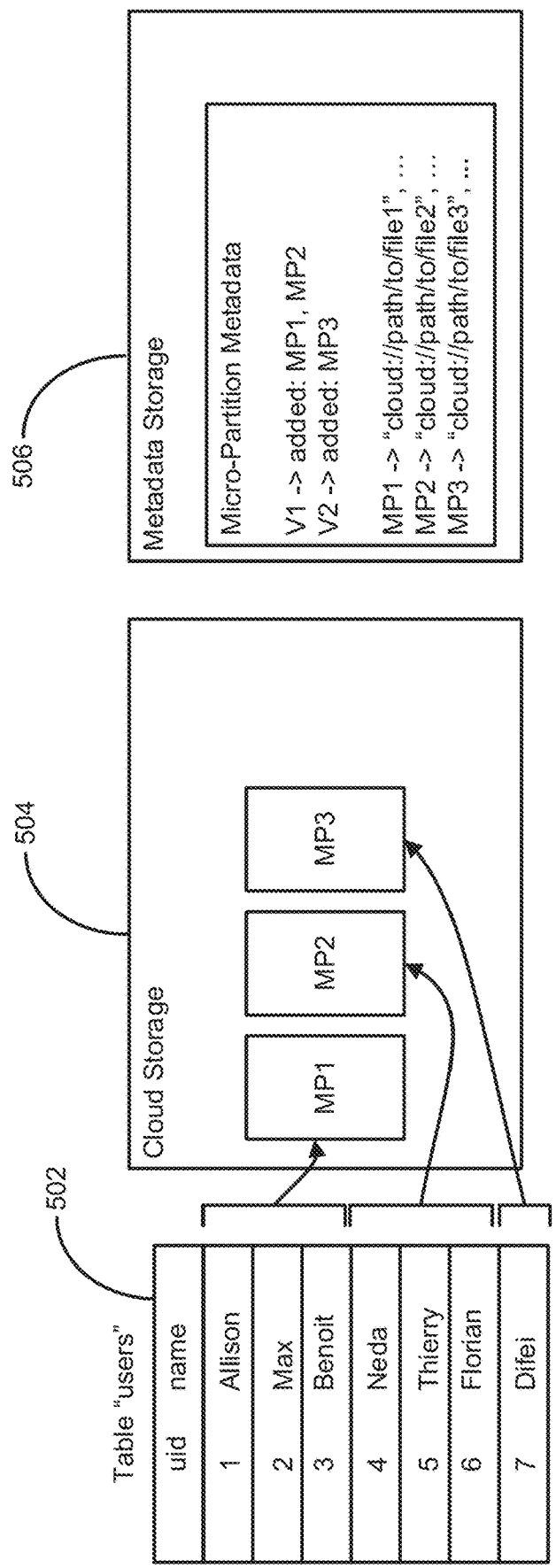
Figure 7:
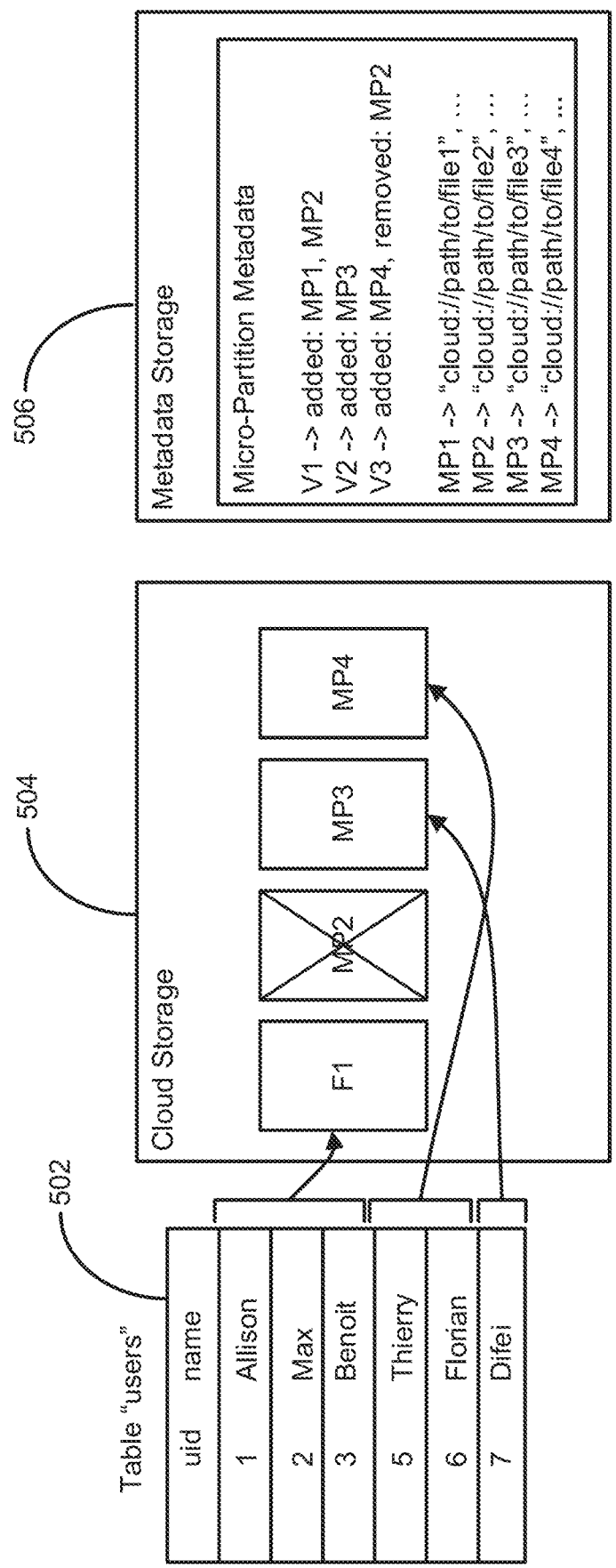
Figure 8:
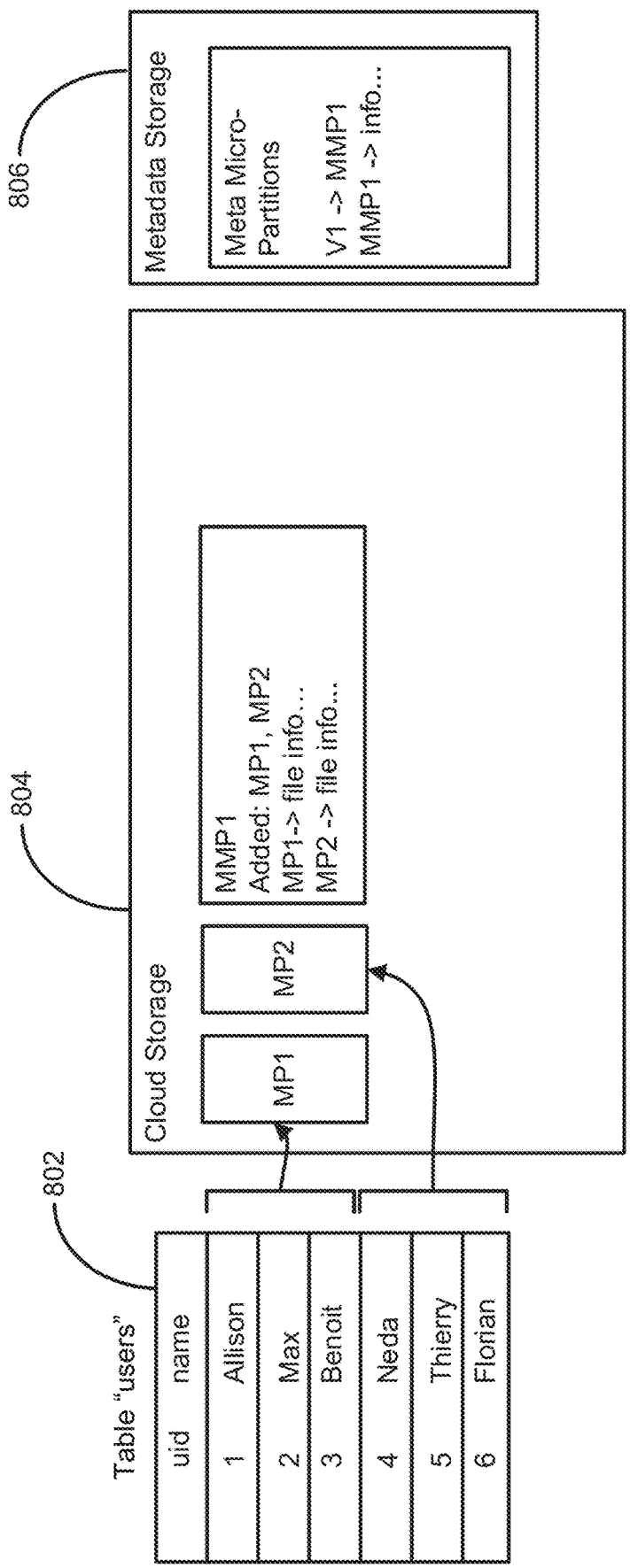
FIGS. 8-10 are block diagrams of an example operation of a database system when both table data and metadata are stored in immutable cloud storage, according to an example embodiment of the systems and methods described herein.
Figure 9:
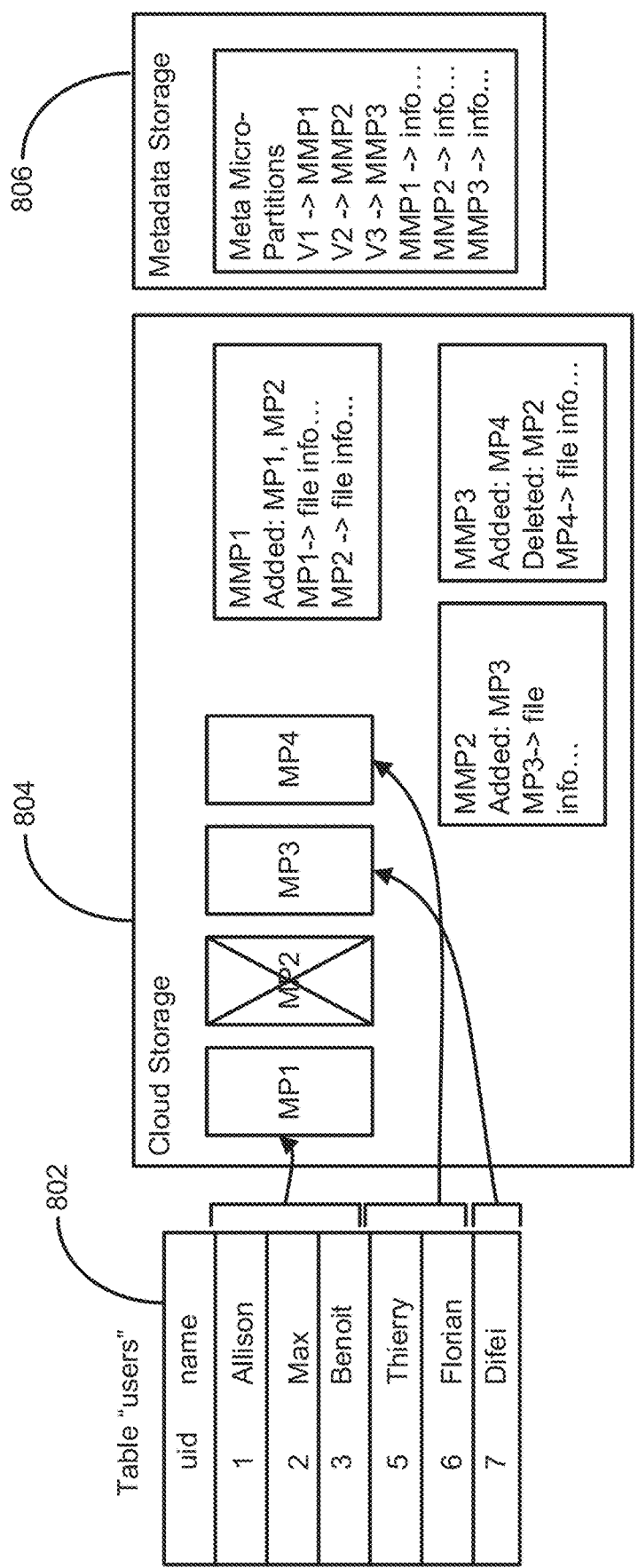
Figure 10:
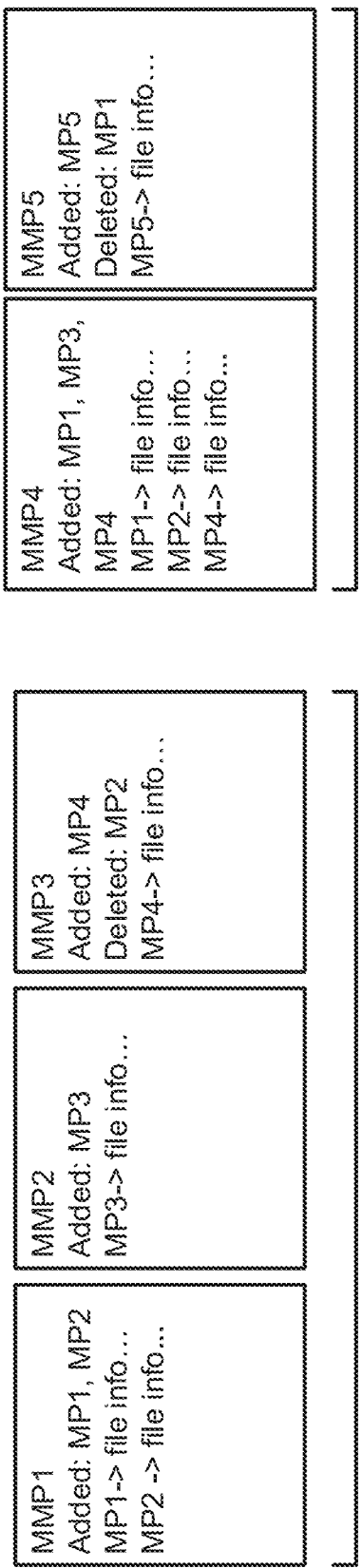

FIGS. 5-7 illustrate example operation of a database system when table data is stored in immutable storage (such as a cloud resource) and metadata is stored in mutable storage (such as a local key-value store). FIGS. 8-10 illustrate example operation of a database system when both table data and metadata is stored in immutable storage. In one example embodiment, data in database tables is stored in micro-partitions in the cloud. Metadata around tables and micro-partitions is stored in the metadata store. The metadata store may be a key-value store. Other example systems may use other technologies such as main memory storage or micro-partition system storage to store metadata.

FIG. 5 illustrates a table 502 having data stored in micro-partitions and associated metadata. The table 502 is a "users" table stored in two physical micro-partitions MP1 and MP2 in cloud storage 504. The micro-partitions MP1 and MP2 constitute micro-partitions of the table 502 that serve as immutable storage devices that cannot be updated in-place. The table 502 includes a "uid" column and a "name" column. The micro-partitions MP1 MP2 include the data (e.g., the field values) for the rows and columns of the table 502. Specifically, micro-partition MP1 includes the table data for the first three rows (i.e., uids 1, 2, and 3 and names Allison, Max, and Benoit) while micro-partition MP2 includes the table data for the last three rows (uids 4, 5, and 6, and names Neda, Thierry, and Florian). In one embodiment, each micro-partition MP1 and MP2 stores data in a column-by-column format with the values for the "uid" column in a contiguous block and the values for the "name" column in a contiguous block within the respective micro-partition.

Micro-partition metadata is stored within metadata storage 506. The micro-partition metadata contains table versions and information about each table data micro-partition, this case MP1 and MP2. The metadata storage 506 may include mutable storage (storage that can be over written or written in-place), such as a local micro-partition system, system, memory, or the like. The metadata storage 506 may further include immutable storage that cannot be updated in-place.

In one embodiment, the micro-partition metadata consists of two data sets: table versions and micro-partition information. The table versions data set includes a mapping of table versions to lists of added micro-partitions and removed micro-partitions. Micro-partition information consists of information about each micro-partition, including micro-partition path, micro-partition size, micro-partition key id, and summaries of all rows and columns that are stored in the micro-partition, for example. In the state illustrated, table version V1 indicates that micro-partitions MP1 and MP2 were added (V1->added: MP1, MP2). The micro-partition information shows information about MP1 (MP1->"cloud://path/to/file1", fileSize: 14 MB, fileKeyId: 3452, summaries of rows and columns, etc.) and MP2 (MP2->"/path/to/file2", fileSize: 11 MB, fileKeyId: 7965, summaries of rows and columns, etc.).

Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the updated records.

FIG. 6 illustrates the table and metadata of FIG. 5 after inserting a record in the "users" table 502. By way of example, when inserting the record (7, "Difei") into table "users," the data warehouse creates a new micro-partition MP3 in the cloud storage 504 that contains this record. Furthermore, the micro-partition metadata in the metadata storage 506 has been updated to include a new table version V2 and information about MP3. Table version V2 records that micro-partition MP3 was added. Micro-partition information includes the micro-partition path, account, created timestamp, micro-partition size, and summaries of all rows and columns that are stored in the micro-partition MP3.

FIG. 7 illustrates the table and metadata of FIG. 6 after deleting a record in the "users" table 502. For example, when deleting the record (4, "Neda") from table "users," the warehouse may create a new micro-partition MP4 that contains only two records (5, "Thierry") and (6, "Florian"). Micro-partition MP2 may be deleted from the cloud. Micro-partition MP4 may be the same as previous micro-partition MP2 except that row with uid "4" has been removed. The new micro-partition MP4 is stored in the cloud and the micro-partition metadata is updated with a new table version V3 and micro-partition information about micro-partition MP4. V3 indicates that micro-partition MP4 has been added and that micro-partition MP2 has been deleted.

When retrieving data from a table, the data warehouse may compute a scan set of all micro-partitions that need to be read. The scan set is an aggregation of all added micro-partitions except micro-partitions that were removed. The scan set may be computed using table versions. When selecting data from the table at the current time, the scan set is computed using all table versions up to the latest table version. When selecting data from the table at an earlier time, the scan set is computed using all table versions up to the table version that was current at the specified time. This technique of computing a scan set for any given time may be referenced herein as "time travel". For example, when a user selects data from table "users" in FIG. 7 after V3 has been implemented, a resource manager computes the scan set using table versions V1, V2, V3. The scan set is an aggregation of all added micro-partitions MP1, MP2, MP3, MP4 except deleted micro-partition MP2. Therefore, the scan set at the current time consists of micro-partitions MP1, MP3, MP4.

As another example, when selecting data at an earlier time when table version V2 was current, the scan set is computed using table versions V1 and V2. The scan set is aggregation of all added micro-partitions MP1, MP2, MP3. Since there were no removed micro-partitions, the scan set consists of micro-partitions MP1, MP2, MP3. In one embodiment, the scan set may be pruned using micro-partition information. For example, summaries of rows and columns of micro-partitions may be used to prune micro-partitions from the scan set because the contents of these micro-partitions will not be needed to compute a query result.

The above example method of storing micro-partition metadata in the metadata storage 506 has limitations. It consumes too much space and results in slow performance. In practice, micro-partition metadata of hundreds of millions of micro-partitions results in terabytes of micro-partition metadata. This results in slow performance when computing the scan set and pruning the scan set. Embodiments disclosed herein overcome one or more of these limitations. Storing and maintaining this (mutable) metadata on (non-mutable) cloud storage allows a database system to have virtually unlimited storage capacity and faster retrieval of metadata.

In one embodiment, metadata may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata micro-partitions with a columnar layout.

FIG. 8 illustrates the table 802 of FIG. 5 with metadata micro-partitions stored in cloud storage. The user's table 802 is shown with table data stored in table data micro-partitions MP1 and MP2 within cloud storage 804, similar to the structure shown in FIG. 5. However, metadata about the table data micro-partitions is stored in metadata micro-partition MMP1 in the cloud storage 804 as well. Metadata micro-partition MMP1 contains a list of added micro-partitions MP1 and MP2, including all micro-partition information about these micro-partitions. For example, the micro-partition information that was previously in the key-value store in the embodiment of FIG. 1 is in the metadata micro-partition (e.g., MMP1). At the point in time illustrated in FIG. 6, there are no deleted micro-partitions indicated in the metadata micro-partition MMP 1. The metadata storage 806 only stores table version V1, which maps to metadata micro-partition MMP1, and information about metadata micro-partition MMP1. The information about metadata micro-partition MMP1 includes the micro-partition path of MMP1 and may include more information. Thus, both table data micro-partitions and metadata micro-partitions are stored in cloud storage, while information about metadata micro-partitions is stored in metadata storage 806 or other local and/or mutable storage.

FIG. 9 illustrates the table and metadata of FIG. 8 after adding a record (7, "Difei") and deleting a record (4, "Neda"). The first modification (insert uid "7" and name "Difei") stored micro-partition MP3 and metadata micro-partition MMP2 in the cloud. MMP2 lists added micro-partition MP3, including all micro-partition information about MP3. The metadata storage 806 is updated with table version V2, which maps to MMP2, and information about MMP2. The second modification (delete uid "4" and name "Neda") stored micro-partition MP4 and metadata micro-partition MMP3 in the cloud storage 804. MMP3 lists added table data micro-partition MP4, including all micro-partition information of MP4, and also lists deleted table data micro-partitions of MP2.

The storage of the metadata micro-partitions MMP1, MMP2, and MMP3 in cloud storage 804 or immutable storage allows for increased metadata storage capacity. For example, all metadata about the table data micro-partitions MP1, MP2, MP3, and MP4 is found within the cloud storage 804 in the metadata micro-partitions MMP1, MMP2, and MMP3. Metadata about the metadata micro-partitions MMP1 (information about the metadata), which is much smaller in size, is stored in a key-value store, mutable storage, and/or local storage.

In one embodiment, a data warehouse computes a scan set of micro-partitions that must be read to answer a query. The scan set is computed using table versions. Given a set of table versions, the data warehouse reads information about the corresponding metadata micro-partitions from the metadata store. It then downloads the metadata micro-partitions from the cloud and reads the list of added and delete micro-partitions. Using these lists, it computes the scan set. Using micro-partition information stored in metadata micro-partitions (e.g. information about rows and columns), the scan set may be pruned such that only relevant portions of the scan set are scanned to respond to the query.

For example, when selecting data from table "users" 802 at the time illustrated in FIG. 9, the scan set is computed using table versions V1, V2, and V3. The warehouse reads information about corresponding metadata micro-partitions MMP1, MMP2, and MMP3. It downloads these metadata micro-partitions from the cloud. The micro-partitions may be downloaded in parallel. In one embodiment, a resource manager can begin reading one of the micro-partitions even if the others have not yet completely downloaded. From the aggregated list of added micro-partitions MP1, MP2, MP3, and MP4 it removes deleted micro-partition MP2. The resulting scan set would therefore be MP1, MP3, and MP4. These micro-partitions (or sub-portions of them) may be retrieved by an execution node for executing the query.

In one embodiment, metadata micro-partitions are periodically consolidated in the background. Consolidation, or "compaction," of metadata micro-partitions aggregates all added micro-partitions of all metadata micro-partitions and removes all deleted micro-partitions from that list. Consolidation creates one or more compacted metadata micro-partitions that contain only the resulting added-micro-partitions list, including all micro-partition information of these micro-partitions. The purpose of consolidation is two-fold.

First, many metadata micro-partitions are compacted into a much smaller set of metadata micro-partitions for faster downloading and reading. Second, micro-partitions that are not referenced anymore in the compacted metadata micro-partitions can be removed from the cloud once the old metadata micro-partitions are removed.

Metadata micro-partition versions distinguish different sets of metadata micro-partitions. The compacted micro-partitions in one metadata micro-partition version are a consolidation of all metadata micro-partitions of the previous metadata micro-partition version. New metadata micro-partitions are always registered under the latest metadata micro-partition version. Old metadata micro-partitions may be deleted from cloud storage after they have been consolidated. All micro-partitions that are not referenced in compacted micro-partitions may be deleted once they are not referenced in any metadata micro-partition anymore.

FIG. 10 is a block diagram illustrating consolidation of the metadata micro-partitions shown in FIG. 9. Specifically, metadata micro-partitions MMP1, MMP2, and MMP3 are shown consolidated into compacted metadata micro-partition MMP4. Metadata micro-partition MMP4 only contains added micro-partitions MP1, MP3, and MP4 because MP2 was deleted in MMP3. MMP4 also contains all micro-partition information of MP1, MP3, and MP4. In one embodiment, metadata micro-partition version three (MMP V3) is created and MMP4 is registered under MMP V3. A new metadata micro-partition MMP5 is registered under the latest metadata micro-partition version MMP V3. MMP5 corresponds to table version V4 (not shown in FIG. 9). Table version V3 may point to either MMP1, MMP2, and MMP3 of MMP V1 or to MMP4 of MMP V3, as they will result in the exact same scan set. As is illustrated, creation of the consolidated metadata micro-partition MMP4 allows for one micro-partition to do what previously took three micro-partitions. In one embodiment, an indication of a metadata micro-partition version may be stored after completing consolidation so that a version before the consolidation may still be determined or accessed. All subsequent table data changes may be reflected based on MMP4 or later. Thus, MMP1, MMP2, and MMP3 may be deleted, if desired or if they represent versions which no longer need to be maintained (e.g., for purposes of a "time travel" feature).

Constructing the scan set for a table version uses only metadata micro-partitions of a single metadata micro-partition version. The metadata micro-partition version to use is the largest metadata micro-partition version that is smaller or equal than the given table version. For example, constructing the scan set for table version V3 in FIG. 9 uses metadata micro-partition version V3 because it is the largest metadata micro-partition version that is smaller or equal to V3. Given the example in FIG. 9, Table 1 provides a list of metadata micro-partitions that must be read when constructing the scan set for a given table version:

TABLE 1

| Table Version | Metadata Micro-partition Version | Metadata Micro-partitions | Scan Set |
| --- | --- | --- | --- |
| V1 | MMP V1 | MMP1 | MP1, MP2 |
| V2 | MMP V1 | MMP1, MMP2 | MP1, MP2, MP3 |
| V3 | MMP V3 | MMP4 | MP1, MP3, MP4 |
| V4 | MMP V3 | MMP4, MMP5 | MP3, MP4, MP5 |

In one embodiment, consolidation of metadata micro-partitions happens in the background process in the data warehouse without any impact on the user workload. New metadata micro-partitions may be added while compacted micro-partitions are computed. Only when the compacted micro-partition has been uploaded to the cloud may it be used to compute that scan set.

Various performance improvements may be achieved with the immutable storage of metadata. In one embodiment, metadata micro-partitions are prefetched. For example, when downloading a set of metadata micro-partitions, the data warehouse downloads the metadata micro-partitions in parallel in the background before the metadata micro-partitions are opened by the process. Pre-fetching improves reading time of metadata micro-partitions because when the process wants to open a metadata micro-partition it may have already been downloaded using pre-fetching.

In one embodiment, metadata micro-partitions are cached. Metadata micro-partitions may be cached on the local micro-partition system of a process. Metadata micro-partitions may only be downloaded once, even if they are read by many different processes that share the same micro-partition system. Old cached metadata micro-partitions may be deleted from the cache if the cache grows out of space. In this case, the metadata micro-partitions may be downloaded again as needed.

In one embodiment, metadata micro-partitions have a columnar layout. Micro-partition information within metadata micro-partitions is stored with a columnar layout. This means the format of the metadata micro-partition is not row-by-row, but column-by-column. If a process reads information about a column in a metadata micro-partition, it only needs to read a single, contiguous block of bytes. In one embodiment, every block of bytes is compressed using a standard compression algorithm ("gzip"). Both these techniques improved read performance.

Security improvements are also implemented in some embodiments. In one embodiment, metadata micro-partitions are encrypted using individual micro-partition keys. Within a metadata micro-partition, columns may be encrypted individually using AES-CTR mode with different start counters. This allows a database system to read an individual column from a metadata micro-partition because it can be decrypted without needing to decrypt the whole micro-partition at once. Encryption improves security because nobody can read the metadata micro-partition without having the proper micro-partition key.

For verification that metadata micro-partitions have not been altered, the system may store hashes of columns for each column within a metadata micro-partition. Before decrypting the data, the system compares the hash of the encrypted column with the stored hash of the column of this metadata micro-partition. If the hashes do not match, the metadata micro-partition must have been altered. This improves security because altering of metadata micro-partitions are detected by the database system.

Figure 13:
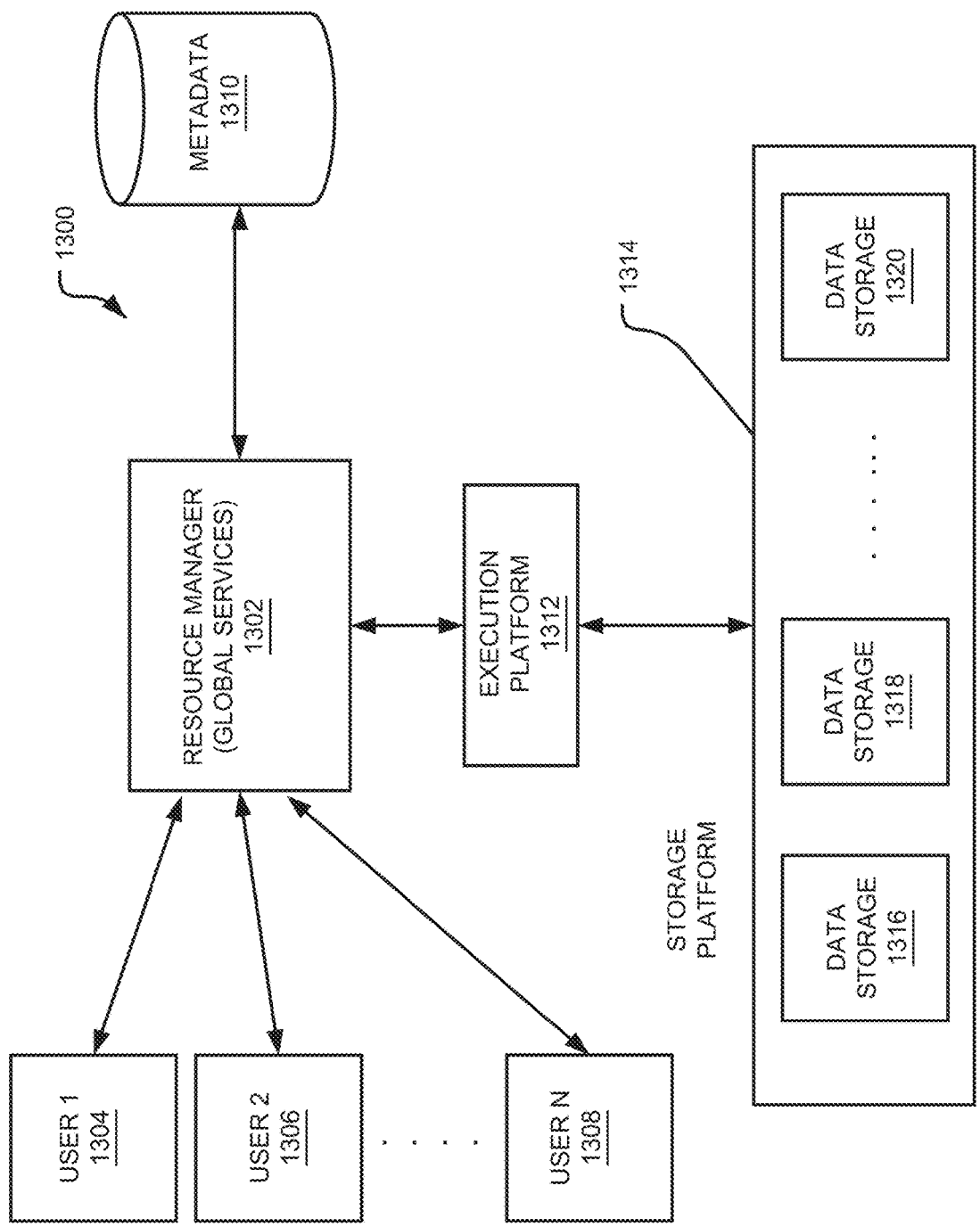
FIG. 13 is a schematic block diagram of a processing platform for providing database services, according to an example embodiment of the systems and methods described herein.

In some embodiments, the subject technology can store (e.g., in a network-based storage platform as discussed further in FIG. 13) cumulative table metadata (e.g., the cumulative table metadata 302), regional metadata corresponding to grouping expression properties (e.g., the grouping expression properties 314a-314d), micro-partition statistics (e.g., micro-partition statistics 304), and/or column expression properties (e.g., the column expression properties 308-312). As mentioned herein, expression properties may be referred to by "EP" or "EPs".

In an embodiment, during query execution, the aforementioned metadata corresponding to grouping expression properties described in FIGS. 4A-4C, during runtime (e.g., execution of a query), are computed and cached into memory (e.g., volatile storage), while the metadata corresponding to micro-partition statistics may be stored in persistent storage. However, this approach may increase latency and/or processor utilization in completing a query as such metadata is computed each time a query is executed in order to complete the query.

In the following discussion, the described embodiments instead pre-compute (e.g., prior to query execution) at least the metadata corresponding to grouping expression properties, which are stored (e.g., as a "two-level" data structure) in persistent storage provided by the subject system. In this fashion, such metadata corresponding to the grouping expression properties can be accessed from the persistent storage while foregoing repeated computations, during query execution, to access the metadata for completing the query.

In an example, when a consolidated metadata micro-partition MMP4 is created (illustrated in FIG. 10), a 2-level EP associated to MMP4 is pre-computed by grouping micro-partition statistics, column properties, and so forth, from all the added micro-partitions in MMP4 (i.e. MP1, MP3 and MP4).

Figure 11:
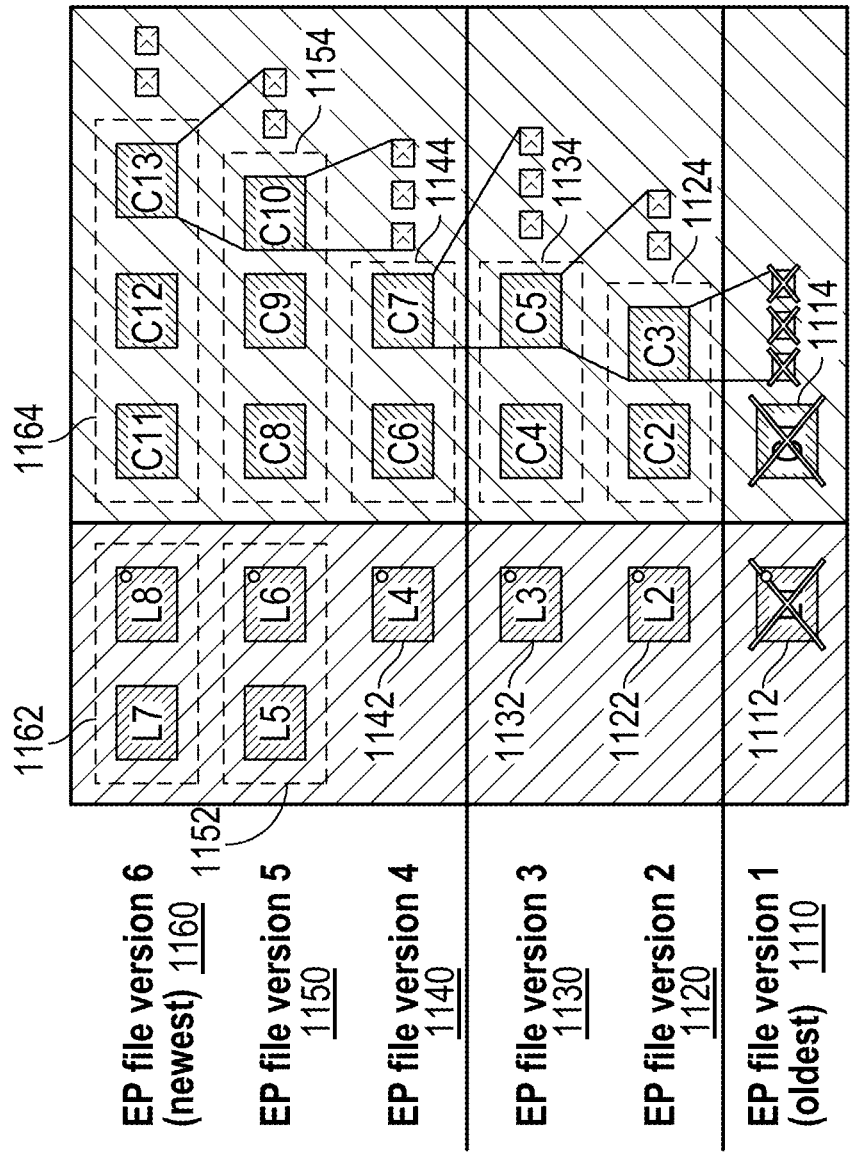
FIG. 11 illustrates examples of two-level data structures for storing metadata in accordance with some embodiments of the subject technology.

FIG. 11 illustrates examples of two-level data structures for storing metadata in accordance with some embodiments of the subject technology. Such a two-level data structure (also referred to as "2-level EP" or a "2-level EP file" herein) can at least store metadata corresponding to the aforementioned grouping expression properties and micro-partition statistics. More specifically, FIG. 11 is a schematic diagram of different versions of such a two-level data structure for storage of metadata in persistent storage (e.g., in the cloud) over various periods of time. In an embodiment, over time, data is received, processed, and/or stored in a given storage platform (described further in FIG. 13 below) and/or the file system 110 of the system 100. A different version of a two-level data structure can be generated, similar to the previous discussion in FIGS. 4A-4C of different versions of the aforementioned metadata, after a period of time (e.g., a failsafe period, a data retention period, and the like) and/or a particular amount of subsequent metadata has been received and/or generated by the subject system. In an embodiment, the example two-level data structures of FIG. 11 are tree data structures with a respective one-way pointer from a root node (e.g., a node corresponding to grouping expression properties) to each of a set of leaf nodes (e.g., corresponding to one or more micro-partition statistics).

As illustrated, a first EP file version 1110 ("version 1") corresponds to an initial (e.g., "oldest") version of a2-level EP file 1112 that is generated by a resource manager (e.g., the resource manager 102) for storage in persistent storage. As further illustrated, different subsequent versions of 2-level EP files include a second EP file version 1120 including a 2-level EP file 1122, a third EP file version 1130 including a 2-level EP file 1132, a fourth EP file version 1140 including a 2-level EP file 1142, a fifth EP file version 1150 including 2-level EP files 1152, and a sixth EP file version 1160 including 2-level EP files 1162. In FIG. 11, each EP file version is generated by the background consolidation service (provided by the resource manager 102) e.g., each time when EP files get consolidated, a new EP file version is created.

Each of the aforementioned 2-level EP files contains both grouping expression properties and grouping micro-partition stats. In an example, each time a new EP file version gets created, a list of new compact EP files are created. For each newly created compact EP file, a grouping micro-partition stats (e.g., illustrated as EP file metadata in FIG. 12) and grouping EPs for columns are computed about all the added micro-partitions in that compact EP file, and saved in 2-level EP files. For example, L3 contains the grouping stats and EPs for C4 and C5.

In FIG. 11, the first EP file version 1110 is shown as being deleted (e.g., removed) from persistent storage, which can occur, in embodiment, as a new version of the 2-level EP file is generated by the subject system. As further shown, a compact EP file 1114 and delta EP files (e.g., smaller squares to the right of compact EP file 1114) are included in the first EP file version 1110.

In the second EP file version 1120, compact EP files 1124 are included, and delta EP files (e.g., smaller squares) are to the right of compact EP files 1124. The compact EP files and/or the delta files are the files containing micro-partition statistics and column expression properties as described in FIG. 12. In the third EP file version 1130, compact EP files 1134 are included, and delta EP files (e.g., smaller squares) are to the right of compact EP files 1134. In an embodiment, the second EP file version 1120 and the third EP file version 1130 are kept in storage during a data retention period and a failsafe period. In an example, a data retention period specifies a period of time for which historical data is preserved and queryable, and a failsafe period corresponds to a period of time during which historical data is recoverable by the subject system, and can start immediately after data passes its retention period.

The fourth EP file version 1140 includes compact EP files 1144, and delta EP files (e.g., smaller squares) are to the right of compact EP files 1144.

The fifth EP file version 1150 includes compact EP files 1154, and delta EP files (e.g., smaller squares) are to the right of compact EP files 1154. The sixth EP file version 1160 includes compact EP files 1164, and delta EP files (e.g., smaller squares) are to the right of compact EP files 1164.

In an embodiment, the second EP file version 1120 and the third EP file version 1130 are kept in storage during a data retention period.

In an embodiment, different versions of an EP file can be generated during a consolidation or "compaction" process of metadata as described above.

In an example, processing of a compacted EP file for a 2-level-EP file occurs in the background (e.g., as part of a background service or process provided by the resource manager 102 as described before), which enables foreground usage to have a low latency thereby improving the functionality of a computer (e.g., the subject system or components thereof).

During compilation and optimization of a query on the database, a processor may scan cumulative table metadata (e.g., stored in a cache) to determine if a particular table includes information pertaining to the query. In response to determining, based on the cumulative table metadata, that the table includes information pertaining to the query, the processor may scan, from persistent storage, one of the grouping expression properties in FIG. 11 to determine which grouping of micro-partitions of the table include information pertaining to the query. In response to determining, based on a first cumulative expression property, that a first grouping of micro-partitions does not include information pertaining to the query, the processor however may discontinue database scanning of that first grouping of micro-partitions. In response to determining, based on a second cumulative expression property, that a second grouping of micro-partitions includes information pertaining to the query, the processor may proceed to scan expression properties, in persistent storage, for that second grouping of micro-partitions. The processor may efficiently determine which micro-partitions include pertinent data and which columns of which micro-partitions include pertinent data. The processor may proceed to scan only the relevant column (s) and micro-partition(s) from persistent storage that include information relevant to a database query. In this manner, a cost efficient technique for responding to a database query is provided by a 2-level EP file.

Figure 12:
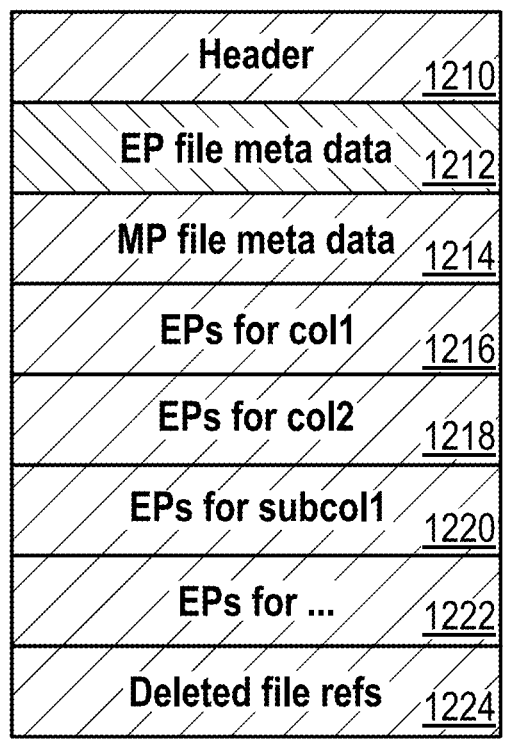
FIG. 12 illustrates an example format for an expression properties ("EP") file (e.g., for two-level data structures), which can be utilized for storage of metadata in accordance with some embodiments of the subject technology.

FIG. 12 illustrates example format for an EP file 1200 (e.g., for two-level data structures), which can be utilized for storage of metadata in accordance with some embodiments of the subject technology.

In an embodiment, the EP file 1200 includes blocks of bytes. The EP file 1200 includes a header 1210, EP file metadata 1212 (e.g., a serialized list of EP metadata objects), micro-partition file metadata 1214 (e.g., a serialized list of metadata objects), expression properties 1216 for a first column (e.g., each block includes an array of metadata per micro-partition file), expression properties 1218 for a second column (e.g., each block includes an array of metadata per micro-partition file), expression properties for a first sub-column 1220 (e.g., each block includes an array of metadata per micro-partition file), and expression properties 1222 for other columns/sub-columns (e.g., each block includes an array of metadata per micro-partition file). Further, the EP file 1200 includes information for deleted global file references 1224 (e.g., for metadata corresponding to data manipulation language events and the like).

In an embodiment, EP file metadata 1212 includes data for metadata objects where each metadata object includes information to identify a given EP file e.g., account ID, table ID, EP file version, start file ID, and the like.

FIG. 13 illustrates a block diagram of a processing platform 1300 for providing database services, according to one embodiment. The processing platform 1300 includes a resource manager 1302 that is accessible by multiple users 1304, 1306, and 1308. The resource manager 1302 may also be referred to herein as a resource manager or global services. In some implementations, resource manager 1302 can support any number of users desiring access to data or services of the processing platform 1300. Users 1304-1308 may include, for example, end users providing data storage and retrieval queries and requests, system administrators managing the systems and methods described herein, software applications that interact with a database, and other components/devices that interact with resource manager 1302.

The resource manager 1302 may provide various services and functions that support the operation of the systems and components within the processing platform 1300. Resource manager 1302 has access to stored metadata 1310 associated with the data stored throughout data processing platform 1300. The metadata 1310 may be stored by a cloud provider, may be stored separately and independently of the storage platform 1314, and/or may be stored alongside database data stored in the storage platform 1314. The resource manager 1302 may use the metadata 1310 for optimizing user queries. In some embodiments, metadata 1310 includes a summary of data stored in remote data storage systems as well as data available from a local cache (e.g., a cache within one or more of the clusters of the execution platform 1312). Additionally, metadata 1310 may include information regarding how data is organized in the remote data storage systems and the local caches. Metadata 1310 allows systems and services to determine whether a piece of data needs to be processed without loading or accessing the actual data from a storage device.

As part of the data processing platform 1300, metadata 1310 may be collected when changes are made to the data using a data manipulation language (DML), which changes may be made by way of any DML statement. Examples of manipulating data may include, but are not limited to, selecting, updating, changing, merging, and inserting data into tables. As part of the processing platform 1300, micro-partitions may be created, and the metadata may be collected on a per micro-partition and a per column basis. This collection of metadata may be performed during data ingestion or the collection of metadata may be performed as a separate process after the data is ingested or loaded. In an implementation, the metadata 1310 may include a number of distinct values; a number of null values; and a minimum value and a maximum value for each micro-partition. In an implementation, the metadata 1310 may further include string length information and ranges of characters in strings.

In one embodiment, at least a portion of the metadata 1310 is stored in immutable storage. For example, the metadata 1310 may be stored on the storage platform 1314 along with table data. In one embodiment, the same or separate cloud storage resources as that used for table data may be allocated and used for the metadata. In one embodiment, the metadata may be stored in local immutable storage. In one embodiment, information about the metadata 1310 in immutable storage, or information about metadata micro-partitions stored in immutable storage, is stored in mutable storage. The information about metadata may be referenced for locating and accessing the metadata stored in immutable storage. In one embodiment, systems with metadata storage may be restructured such that the metadata storage is used instead to store information about metadata micro-partitions located in immutable storage.

Resource manager 1302 is further in communication with an execution platform 1312, which provides computing resources that execute various data storage and data retrieval operations. The execution platform 1312 may include one or more compute clusters. The execution platform 1312 is in communication with one or more data storage devices 1316, 1318, and 1320 that are part of a storage platform 1314. The one or more data storage devices 1316, 1318, and 1320 may constitute a plurality of shared storage devices that collectively store the database data. Although three data storage devices 1316, 1318, and 1320 are shown in FIG. 13, the execution platform 1312 is capable of communicating with any number of data storage devices. In some embodiments, data storage devices 1316, 1318, and 1320 are cloud-based storage devices located in one or more geographic locations. For example, data storage devices 1316, 1318, and 1320 may be part of a public cloud infrastructure or a private cloud infrastructure, or any other manner of distributed storage system. Data storage devices 1316, 1318, and 1320 may include hard disk drives (HDDs), solid state drives (SSDs), storage clusters, or any other data storage technology. Additionally, the storage platform 1314 may include a distributed file system (such as Hadoop Distributed File Systems (HDFS)), object storage systems, and the like.

In some embodiments, the communication links between resource manager 1302 and users 1304-1308, mutable storage for information about metadata micro-partitions (i.e., metadata micro-partition metadata), and execution platform 1312 are implemented via one or more data communication networks and may be assigned various tasks such that user requests can be optimized. Similarly, the communication links between execution platform 1312 and data storage devices 1316-1320 in storage platform 1314 are implemented via one or more data communication networks.

These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The resource manager 1302, metadata 1310, execution platform 1312, and storage platform 1314 are shown in FIG. 13 as individual components. However, each of resource manager 1302, metadata 1310, execution platform 1312, and storage platform 1314 may be implemented as a distributed system (e.g., distributed across multiple systems/platforms at multiple geographic locations) or may be combined into one or more systems. Additionally, each of the resource manager 1302, metadata 1310, the execution platform 1312, and the storage platform 1314 may be scaled up or down (independently of one another) depending on changes to the requests received from users 1304-1308 and the changing needs of the data processing platform 1300. Thus, in the described embodiments, the data processing platform 1300 is dynamic and supports regular changes to meet the current data processing needs.

Figure 14:
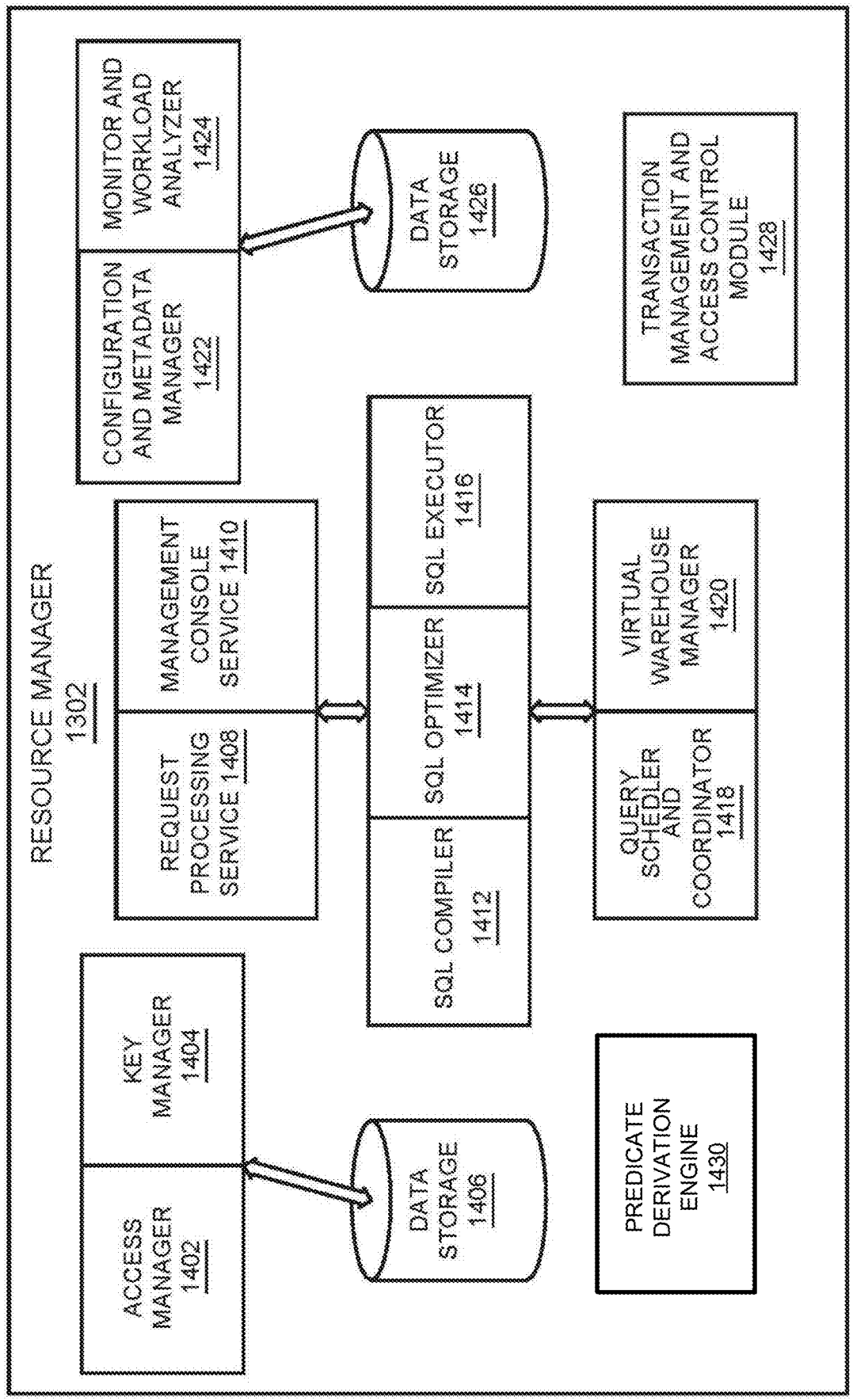
FIG. 14 is a schematic block diagram depicting components of a resource manager, according to an example embodiment of the systems and methods described herein.

FIG. 14 illustrates a block diagram depicting components of resource manager 1302, according to one embodiment. The resource manager 1302 includes an access manager 1402 and a key manager 1404 coupled to a data storage device 1406. The access manager 1402 handles authentication and authorization tasks for the systems described herein. The key manager 1404 manages storage and authentication of keys used during authentication and authorization tasks. A request processing service 1408 manages received data storage requests and data retrieval requests. A management console service 1410 supports access to various systems and processes by administrators and other system managers.

The resource manager 1302 also includes an SQL compiler 1412, an SQL optimizer 1414 and an SQL executor 1416. SQL compiler 1412 parses SQL queries and generates the execution code for the queries. SQL optimizer 1414 determines the best method to execute queries based on the data that needs to be processed. SQL executor 1416 executes the query code for queries received by resource manager 1302. A query scheduler and coordinator 1418 sends received queries to the appropriate services or systems for compilation, optimization, and dispatch to an execution platform 1312. A virtual warehouse manager 1420 manages the operation of multiple virtual warehouses.

Additionally, the resource manager 1302 includes a configuration and metadata manager 1422, which manages the information related to the data stored in the remote data storage devices and in the local caches. A monitor and workload analyzer 1424 oversees the processes performed by the resource manager 1302 and manages the distribution of tasks (e.g., workload) across the virtual warehouses and execution nodes in the execution platform 1312. Configuration and metadata manager 1422 and monitor and workload analyzer 1424 are coupled to a data storage device 1426. In one embodiment, the configuration and metadata manager 1422 collects, stores, and manages metadata in an immutable storage resource. In one embodiment, updates to metadata result in new micro-partitions and are not updated in place.

Metadata micro-partitions, as discussed herein, may include micro-partitions that contain metadata of modifications (e.g., each modification) to any database table in a data warehouse. A modification of a database table may generate one or more metadata micro-partitions, often just a single metadata micro-partition. In one embodiment, metadata micro-partitions contain the following information: information about a metadata micro-partition, including a version number; a list of all added table data micro-partitions; a list of deleted table data micro-partitions; and information about each added table data micro-partition, including micro-partition path, micro-partition size, micro-partition key id, as well as summaries of all rows and columns that are stored in the table data micro-partition.

In one embodiment, the contents of metadata micro-partitions may vary over time. If the format or content of a metadata micro-partition changes, the version number of the metadata micro-partition may be incremented. In one embodiment, the metadata store (or other mutable data storage resource) only stores information about metadata micro-partitions (which are stored in immutable storage), not about table data micro-partitions. In practice, information about metadata micro-partitions stored in the metadata store (or other mutable storage) is very limited and may contain data for thousands of metadata micro-partitions. In one embodiment, information for up to 30,000 metadata micro-partitions may be stored within a metadata micro-partition. This dramatically reduces the amount of storage needed in the metadata store or other mutable storage.

In one embodiment, a system writes metadata micro-partitions to cloud storage for every modification of a database table (e.g., modification of table data micro-partitions). In addition to adding and deleting micro-partitions, every modification to a database table in the data warehouse also generates one or more metadata micro-partitions. Typically, a modification creates a single metadata micro-partition. However, if the modification to the table is large (e.g., an insert into a table that produces very many micro-partitions), it may result in the creation of multiple metadata micro-partitions.

The resource manager 1302 also includes a transaction management and access control module 1428, which manages the various tasks and other activities associated with the processing of data storage requests and data access requests. For example, the transaction management and access control module 1428 provides consistent and synchronized access to data by multiple users or systems. Since multiple users/systems may access the same data simultaneously, changes to the data may be synchronized to ensure that each user/system is working with the current version of the data. Transaction management and access control module 1428 provides control of various data processing activities at a single, centralized location in resource manager 1302.

The resource manager 1302 also includes a predicate derivation engine 1430, which is discussed below. Although predicate derivation engine 1430 is shown as a separate component in resource manager 1302 in examples described herein, in an embodiment, SQL optimizer 1414 performs the same operations as described herein in connection with predicate derivation engine 1430.

Embodiments described herein are directed to systems, methods, and devices for predicate derivation, and more specifically creating new predicates based on existing predicates. A predicate generally refers to something (e.g., an expression) that acts as a filter on data provided in a given column from a table(s).

The following discussion relates to predicate derivation utilizing at least EPs (e.g., expression properties as described before) and any other appropriate sources in accordance with embodiments of the subject technology.

Embodiments of the subject technology can derive predicates during query optimization, which involve EPs. As mentioned before, an EP includes at least one of a summary of database data stored in a column, a type of database data stored in a column, a minimum and maximum for database data stored in a column, a null count for database data stored in a column, a distinct count for database data stored in a column, or a structural or architectural indication of how data is stored, and the like.

Predicate derivation engine 1430, in some embodiments, introduces various improvements including the following:
- deriving predicates not only from other predicates, but also from data distribution information from EPs (e.g., expression properties as discussed herein);
- avoiding unwanted impact to cardinality estimation due to predicate derivation; and
- avoiding artificial runtime errors from derived predicates and provides a way to avoid security issues with secure views.

To improve performance by filtering out irrelevant rows as early as possible, predicate derivation engine 1430 derives both filter and join predicates in various ways using available sources.

To avoid harmful side effects from predicate derivation, predicate derivation engine 1430 keeps the cardinality estimation reasonable with derived predicates and avoids runtime errors from derived predicates.

The following discussion relates to derivation using available sources.

Predicate derivation engine 1430 derives predicates not only from other predicates but also from EP ranges.

Predicate derivation engine 1430 provides a registry that maintains both range and equivalence information from predicates and EPs during predicate derivation. Equivalence information can also be represented as range information, but separate representation is desirable for compactness. The registry is discarded after finishing predicate derivation, based on a hash table, and not to be linked to expressions (e.g., EPs).

Predicate derivation engine 1430 manages and utilizes non-constant range/equivalence information. Predicate derivation engine 1430 can limit the complexity of expressions for range/equivalence information to prevent it from getting too expensive (e.g., high utilization of computational resources) to manage.

The following discussion relates to derivation in feasible ways.

In an example, an important way of deriving predicates is through join predicates. Join predicates include not only equality predicates but also inequality ones.

When predicate derivation engine 1430 has range/equivalence information for a joined expression, new range/equivalence information can be derived through the join predicate and then predicates can be generated from the derived range/equivalence information. In an implementation, the derivation is bidirectional for inner and semi-joins, but unidirectional for left outer and anti-joins. This derivation through join predicates can be performed across query blocks.

When predicate derivation engine 1430 does not have range/equivalence information for a joined expression, the information for the joined expression can be derived from its subexpressions. In an implementation, predicate derivation engine 1430 can perform this derivation solely with EP ranges, and predicate derivation engine 1430 can perform this derivation with the range/equivalence information from predicates. Some valuable classes of functions to support this can be casting functions such as FIXED_TO_FIXED and string functions such as COLLATE_TO_BINARY, UPPER, and LOWER. One valuable case is when there is only one column reference, but derivation can be extended further to cover expressions with multiple column references.

The range/equivalence information is conjunctive in its nature. To derive disjunctive predicates through join, predicate derivation engine 1430 keeps disjunctive predicates separately and then checks whether all disjuncts can be derived to the other side of a join. The disjunctive predicates can be either filter predicate or join predicates, but the filter predicate case will be more common.

Range/equivalence information collection and predicate derivation can be performed in one direction and in one pass. Newly derived predicates are pushed down. Partition pruning is performed again after predicate derivation. In an example, predicate derivation is performed before constant folding because constant folding may remove join predicates needed for derivation.

The following discussion relates to derivation by factoring.

Another way of deriving predicates is by either exact or approximate factoring with disjunctive predicates. Here, exact factoring means factoring out common predicate terms without redundancy such as factoring out (p and q) or (p and r) into p and (q or r). Approximate factoring means factoring out some predicate terms leaving the original predicate as it is like factoring out (p and q) or (r and s) into (p or r) and ((p and q) or (r and s)). For example, TPC-H Q7 (e.g., volume shipping query, which determines the value of goods shipped between certain nations to help in the re-negotiation of shipping contracts, from a decision support benchmark) has the following predicate that can get benefit from this approximate factoring:

(n1.n_name='GERMANY' and n2.n_name='FRANCE') or (n1.n_name='FRANCE' and n2.n_name='GERMANY')

For the approximate factoring, the most valuable derivation will be deriving single table predicates from multi-table predicates, but it can be extended to generate multi-table predicates also.

In an implementation, this predicate derivation by factoring is performed before the derivation through join predicates because predicates derived by factoring can be further derived through join predicates.

The following discussion relates to keeping cardinality estimation reasonable with derived predicates.

In optimizing a given query plan (e.g., by a query compiler such as SQL compiler 1412), determining a number of records on which a given operation from the query plan processes is vital to determine various characteristics (e.g, from an execution context). In an example, particular operations can reduce the number of records that are handled by subsequent operations by applying predicates (e.g., join or filter predicate). A query compiler, in an implementation, estimates a number of rows, or cardinality, of intermediate results after predicates are applied. Thus, cardinality can refer to a total number of rows processed at each level of a query plan, and can be referred to as the cardinality of the plan.

As also mentioned herein, a selectivity of a given predicate that is included in a particular database statement (e.g., SELECT statement with a WHERE clause) can correspond to a value (e.g., rational or decimal number between 0 to 1). More specifically, selectivity refers to a probability that any row will satisfy a predicate (e.g., evaluating to true).

When the value of the predicate selectivity is high, it can be interpreted as a few rows being selected with respect to a size of the table based on the predicate clause. When the selectivity of the same predicate is low, it can be interpreted as a large number of rows being selected with respect to the table size.

For example, a selectivity of 0.01 (e.g., 1 percent) for a predicate executing on a table with 1,000,000 rows means that the predicate returns an estimated 10,000 rows (1% of 1,000,000), and discards an estimated 990,000 rows. In comparison, a highly selective predicate (e.g., a selectivity of 0.10 or less) can return fewer rows for subsequent operations to utilize, and can therefore utilize less computational resources to execute the query.

In some instances, predicate derivation may ruin (e.g., cause an incorrect estimation) cardinality estimation if selectivities of derived predicates are applied redundantly in addition to the selectivities of the original ones.

For the filter predicates derived through a join predicate, predicate derivation engine 1430 does not require special handling to avoid duplicate application of selectivities. In an example, the current join size estimation does not assume independence between filter predicates from different children. It operates as if it assumes complete correlation and cancels out filter selectivities from different children. Predicate derivation engine 1430 can detect and handle duplicate applications of selectivities if predicate derivation engine 1430 adopts the independence assumption for join size estimation in an implementation. Predicate derivation engine 1430 can still track it if predicate derivation engine 1430 finds it informative.

Even if predicate derivation engine 1430 does not have to perform an operation(s) to avoid duplicate application of selectivities, it does not mean that predicate derivation will not change the cardinality estimation. Though it is a desirable change, it can change the estimated intermediate result sizes below the join that was used for the derivation. In addition, it can also change the estimation of the join size even though the change is not due to a duplicate application of selectivities. In an example, a statement such as SELECT*FROM T JOIN S ON T.a=S.a WHERE T.a=1 and S.b=2 is equivalent to SELECT*FROM T JOIN S ON T.a=S.a WHERE S.a=1 and S.b=2, and it is still logically consistent when one is estimated as if it is the other, but their cardinality estimations can be different because the filter selectivities from T.a=1 and S.b=2 will be combined in a different way from those from S.a=1 and S.b=2.

Since there can be changes in cardinality estimation, there can be regressions in performance. For this reason, predicate derivation engine 1430 will need to have an option to ignore selectivities of derived predicates completely in addition to the one to disable the derivation itself. Since this is just to avoid any change whether it is good or bad, it needs to be applied to only new derivations. It is actually not desirable to ignore the selectivities of derived predicates, but it could be needed to mitigate regressions.

The existing derivation logic with filter push down can be utilized but may lack capabilities such as derivation through inequality join predicates. Predicate derivation engine 1430 therefore can provide derivation through inequality join predicates in an implementation.

The following discussion relates to predicates derived by factoring.

In the case of predicates derived by approximate factoring, predicate derivation engine 1430 can avoid duplicate application of selectivities by assigning unique IDs to predicates and associating derived predicates with their origins using the IDs. By maintaining the selectivities applied with predicates derived from each original predicate, predicate derivation engine 1430 can avoid applying them again when applying the selectivity of the original predicate. This will be achieved by subtracting the already applied portion later. When there is a chain of derivations, predicate derivation engine 1430 needs to chain them using the IDs. In the case of predicate derivation by approximate factoring, derived predicates will always be applied first, and they cannot be more selective than their origins.

To avoid duplicate selectivity applications, predicate derivation engine 1430 keeps the state of selectivity application for each group. To make the state size minimal, predicate derivation engine 1430 distinguishes predicates that have been used for derivation from other predicates that have never been used to avoid keeping state for the predicates that have never been used.

Even if predicate derivation engine 1430 avoids duplicate application of selectivities, as in the case of the derivation through join predicates, there can be changes in cardinality estimation, and they may lead to regressions in performance. For this reason, predicate derivation engine 1430 also has the option of ignoring the selectivities of derived predicates. Predicate derivation engine 1430 provides a switch for disabling only exact factoring separately from approximate factoring since exact factoring may affect cardinality estimation without adding derived predicates to ignore.

The following discussion relates to join predicates derived through other join predicates.

In the case of join predicates derived through other join predicates, since they may not be placed in different children, unlike filter predicates, the current join size estimation may assume independence between them. For this reason, predicate derivation engine 1430 avoids applying their selectivities redundantly.

In the case of equality join predicates, predicate derivation engine 1430 can detect and remove redundant predicates themselves with the equivalence information instead of just avoiding duplicate applications of selectivities.

In the case of inequality join predicates, predicate derivation engine 1430 distinguishes derived predicates and their origins to avoid the redundant application of selectivities. To achieve that, predicate derivation engine 1430 can utilize the same technique as the one for the derivation by factoring described above.

However, there are some differences with inequality join predicates. One difference is that original predicates can be applied before the derived predicates and are more selective. In that case, the selectivities of the predicates applied later can simply be ignored. Another difference is that the original and the derived ones can either be placed in different children of a join or not.

When they are in different children of a join, predicate derivation engine 1430 does not have to avoid duplicate application of selectivities since they are canceled out. Predicate derivation engine 1430 merges the information by taking the minimum selectivity. When they are not in different children of a join, predicate derivation engine 1430 avoids duplicate application of selectivities as described for the derivation by factoring.

The following discussion relates to error handling with derived predicates.

Another issue with predicate derivation is that it may induce artificial errors from the expressions included in derived predicates.

Predicate derivation engine 1430 can avoid the issue by capping derived predicates with a special predicate that returns true when there is an error. Predicate derivation engine 1430 can utilize the if-error function to realize it, and activated when the error vector for expression evaluation is activated. In an example, this also is applied to the existing IS NOT NULL predicate derivation from join predicates.

The following discussion relates to secure view optimization with predicate derivation.

For secure views, predicate derivation engine 1430 is careful about pushing down predicates into secure views because it may reveal secrets in the underlying data as described here.

Predicate derivation engine 1430 can avoid such issues by pushing down derived predicates instead of the original predicates when crossing secure view boundaries and suppressing runtime errors from them as described above. In the case that the predicate crossing the boundary is already a derived one, no additional derivation is needed since predicate derivation engine 1430 will suppress runtime errors from it anyway.

Predicate pull-up can be handled in a similar manner by pulling up derived predicates instead of the original predicate when crossing secure view boundaries. Likewise, in the case that the predicate crossing the boundary is already a derived one, no additional derivation is needed.

One more aspect related to pulling up is that predicate derivation engine 1430 needs to hide predicates from the plan explanation. It can be achieved by handling the predicates in a special manner during expression string generation for plan explanation.

The following discussion relates to examples of predicate derivation performed by predicate derivation engine 1430. As discussed herein, EPs can provide minimum and maximum values for a given column, among other types of metadata, which can be utilized to derive (new) predicates.

For example, a predicate (e.g., an original predicate) in a given query statement can filter values in a column A, from Table X, that are less than 10. In a query statement including the same predicate (e.g., filter values that are less than 10) and involving a join operation (e.g., JOIN column A from Table X and column B from Table Y), it can be determined that a value of data (e.g., from a column B) from Table Y will be less than 10 and a new predicate can be derived based on this determination. Moreover, it can be determined that the data from column B whose values are greater than or equal to 10 will not be joined with column A and can be filtered out before the join. Thus, in this manner, predicate derivation by predicate derivation engine 1430 facilitates removing data prior to the join and thereby reducing utilization of computing resources (e.g., processing, memory, and the like). In another example, when the maximum value of data from column A is 10, then it can be determined that the maximum value of data from column B is less than 10 and a new predicate can be derived based on this determination. Further, it can be determined that the data from column B whose values are greater than or equal to 10 will not be joined with column A and can be filtered out before the join.

In another example, a query corresponding to the following is provided for predicate derivation:

select*from t1, t2 where t1.a=t2.a and t1.a=3;

In the above example query, predicate derivation engine 1430 can determine that t2.a is also equal to 3 and derive that t2.a=3 (e.g., values in column a in table t2 are equal to three).

The following discussion relates to various query plans. In an example, a single query can perform a join operation (among other types of operations), and a tree-shaped (or tree structure) execution plan (e.g., a query plan) can be generated to represent the query where such a query plan includes a set of nodes corresponding to various operations that are performed during query execution. Embodiments described herein can modify a given query plan based on the results of predicate derivation.

Figure 15:
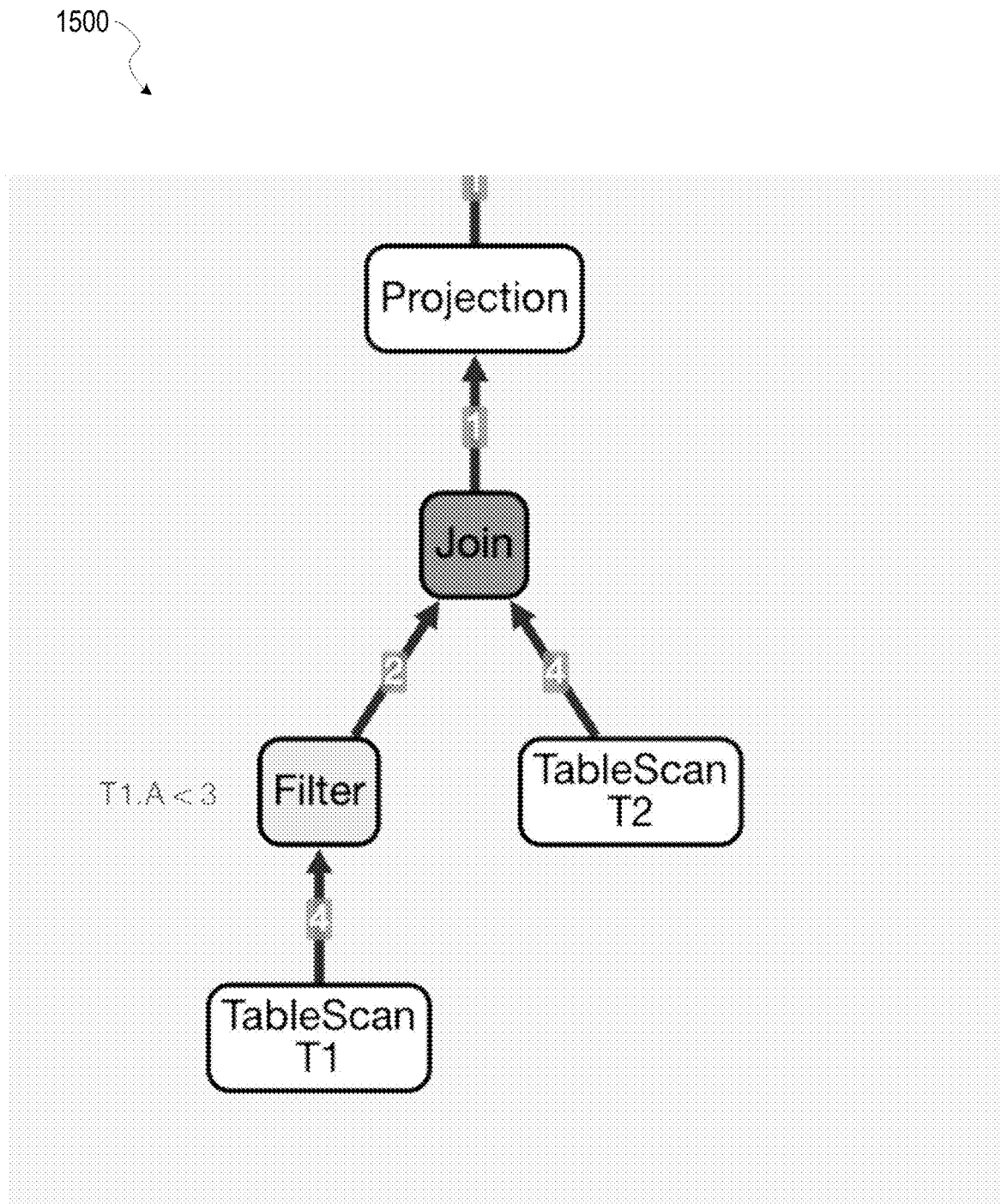
FIG. 15 illustrates an example query plan prior to predicate derivation, in accordance with some embodiments of the subject technology.

FIG. 15 illustrates an example query plan prior to predicate derivation, in accordance with some embodiments of the subject technology.

As illustrated, query plan 1500 corresponds to the following query:

select*from t1, t2 where t1.a=t2.a and t1.a<3

In this example, query plan 1500 illustrates a select statement from two tables t1 and t2 with a predicate WHERE for values in column a in table t1 that are equal to values in column a in table t2, and values in column a in table t1 less than three.

Figure 16:
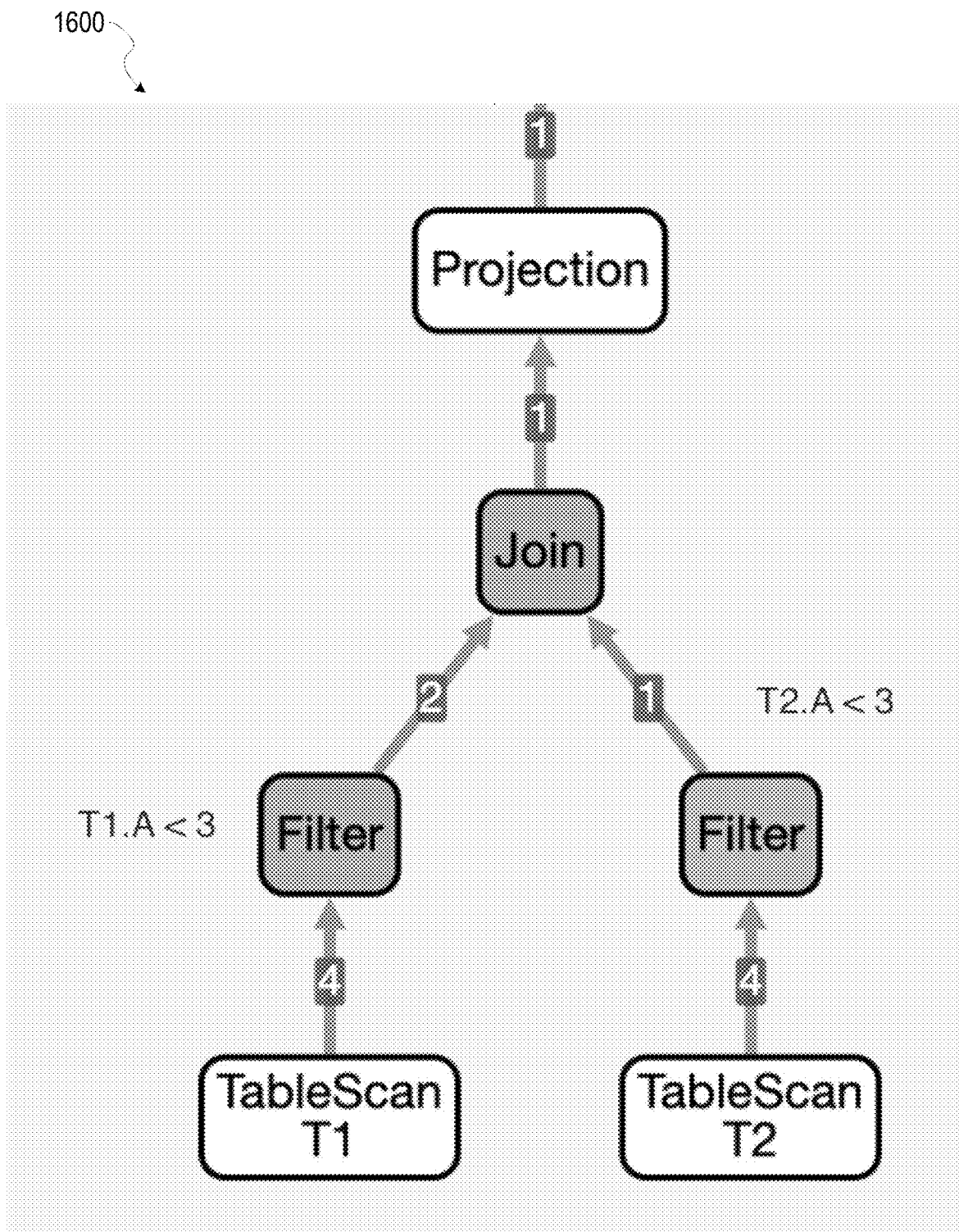
FIG. 16 illustrates an example query plan after predicate derivation, in accordance with some embodiments of the subject technology.

FIG. 16 illustrates an example query plan after predicate derivation, in accordance with some embodiments of the subject technology. FIG. 16 is a continuation of the discussion of the example in FIG. 15.

As illustrated, query plan 1600 is a modified query plan from query plan 1500 after predicate derivation engine 1430 derives that t2.a<3 (e.g., values in column a in table t2 less than three) which is shown in a node (e.g., that was not included in query plan 1500) in query plan 1600 below the join operation and above the table scan operation for table t2.

Figure 17:
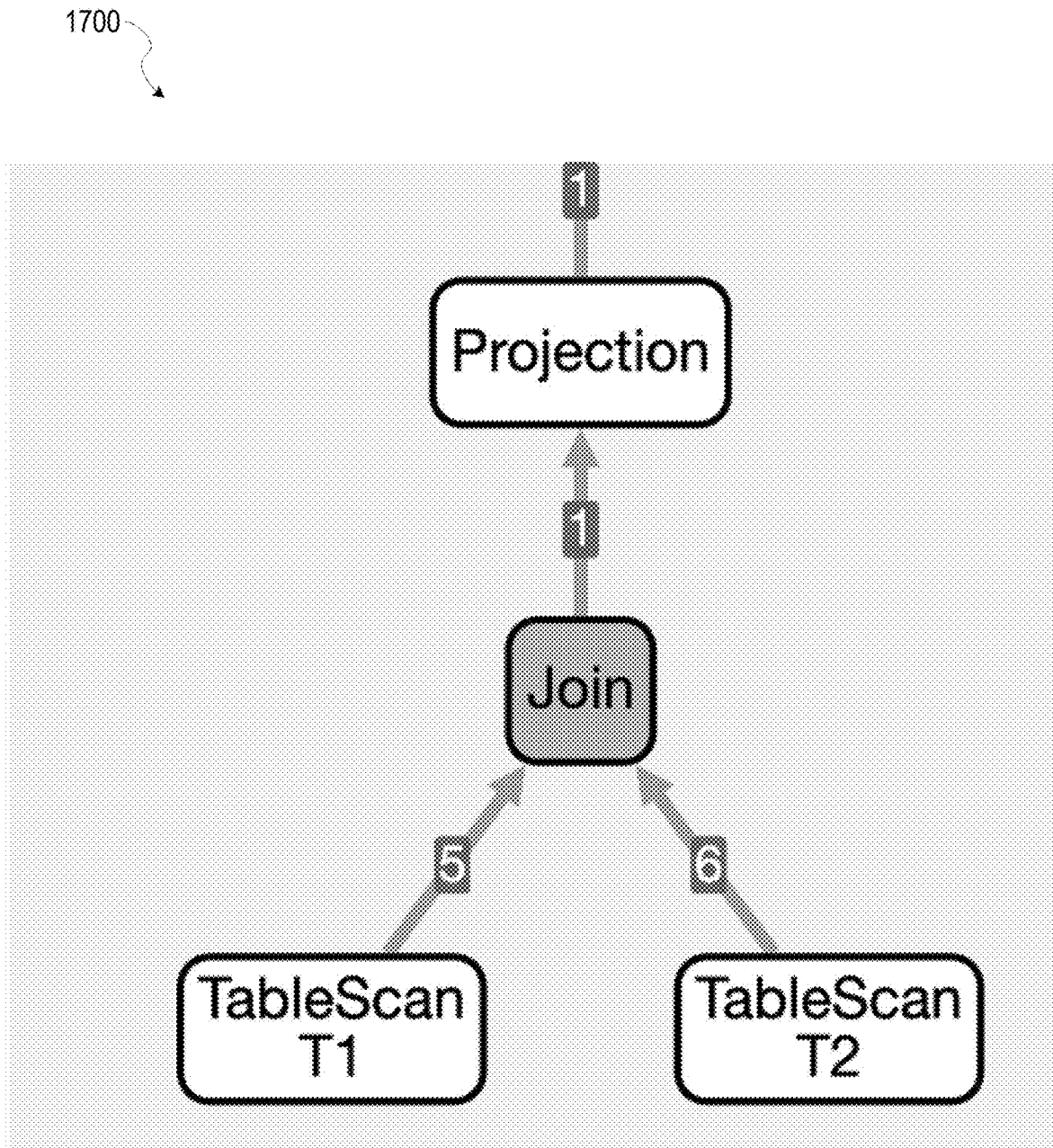
FIG. 17 illustrates another example query plan prior to predicate derivation, in accordance with some embodiments of the subject technology.

FIG. 17 illustrates another example query plan prior to predicate derivation, in accordance with some embodiments of the subject technology.

Figure 18:
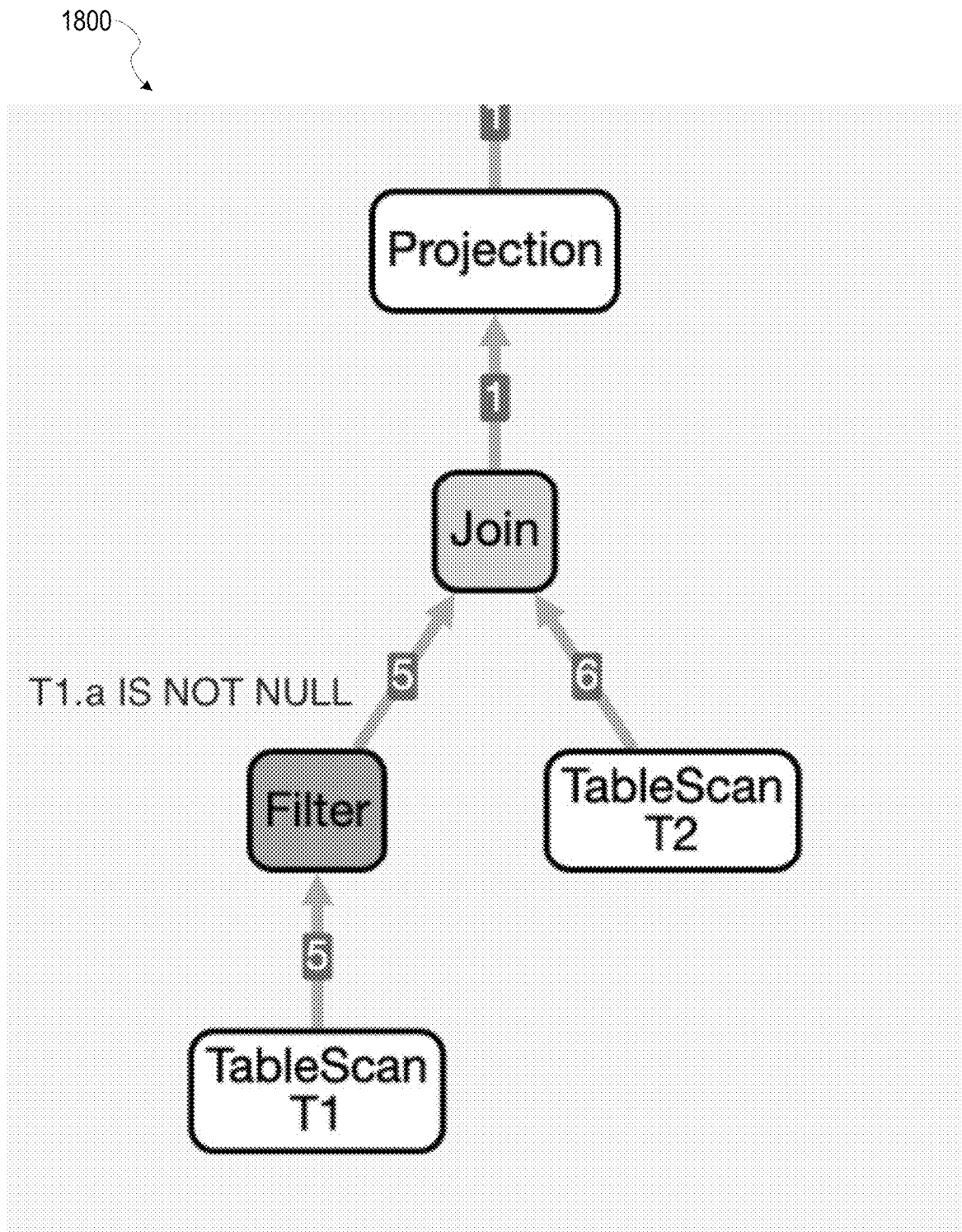
FIG. 18 illustrates an example query plan after predicate derivation, in accordance with some embodiments of the subject technology.

In the example of FIG. 17, predicate derivation engine 1430 derives a IS NOT NULL predicate (e.g., determines non-empty values) for the following statements, which initially creates table t1 and table 2 and inserts respective values into columns a and b of the tables. In the below example statements, t1.a has a null value, and given a regular join operation in a query plan 1700, predicate derivation engine 1430 can derive a t1.a IS NOT NULL predicate.

create or replace table t1 (a int, b int);
insert into t1 values (1,2), (2,3), (1,4), (2,5), (null, null);
create or replace table t2(a int, b int);
insert into t2 values (1,3), (5,2), (10, 2), (3,5),(100,3), (100000,3);
select*from t1, t2 where t1.a=t2.a;

FIG. 18 illustrates an example query plan after predicate derivation, in accordance with some embodiments of the subject technology. FIG. 18 is a continuation of the discussion of the example in FIG. 17.

As illustrated, query plan 1800 is a modified query plan from query plan 1700 after predicate derivation engine 1430 derives the t1.a IS NOT NULL predicate, which is shown in a node (e.g., that was not included in query plan 1700) in query plan 1800 below the join operation and above the table scan operation for table t1.

The following discussion relates to an example of derivation of a predicate involving an EP that includes at least a minimum value and maximum value for a given column. If a column includes a value greater than zero and smaller than a larger value (e.g., 10) then an implied predicate can be derived (e.g., a BETWEEN predicate). From this derived (implied) predicate, an explicit (normal) predicate can be determined.

In an example, an implicit predicate from the EP range can be used to derive a predicate through a join even if the predicate does not exist.

In another example, a predicate can be derived through a join using an implied predicate similar to examples discussed before.

Figure 19:
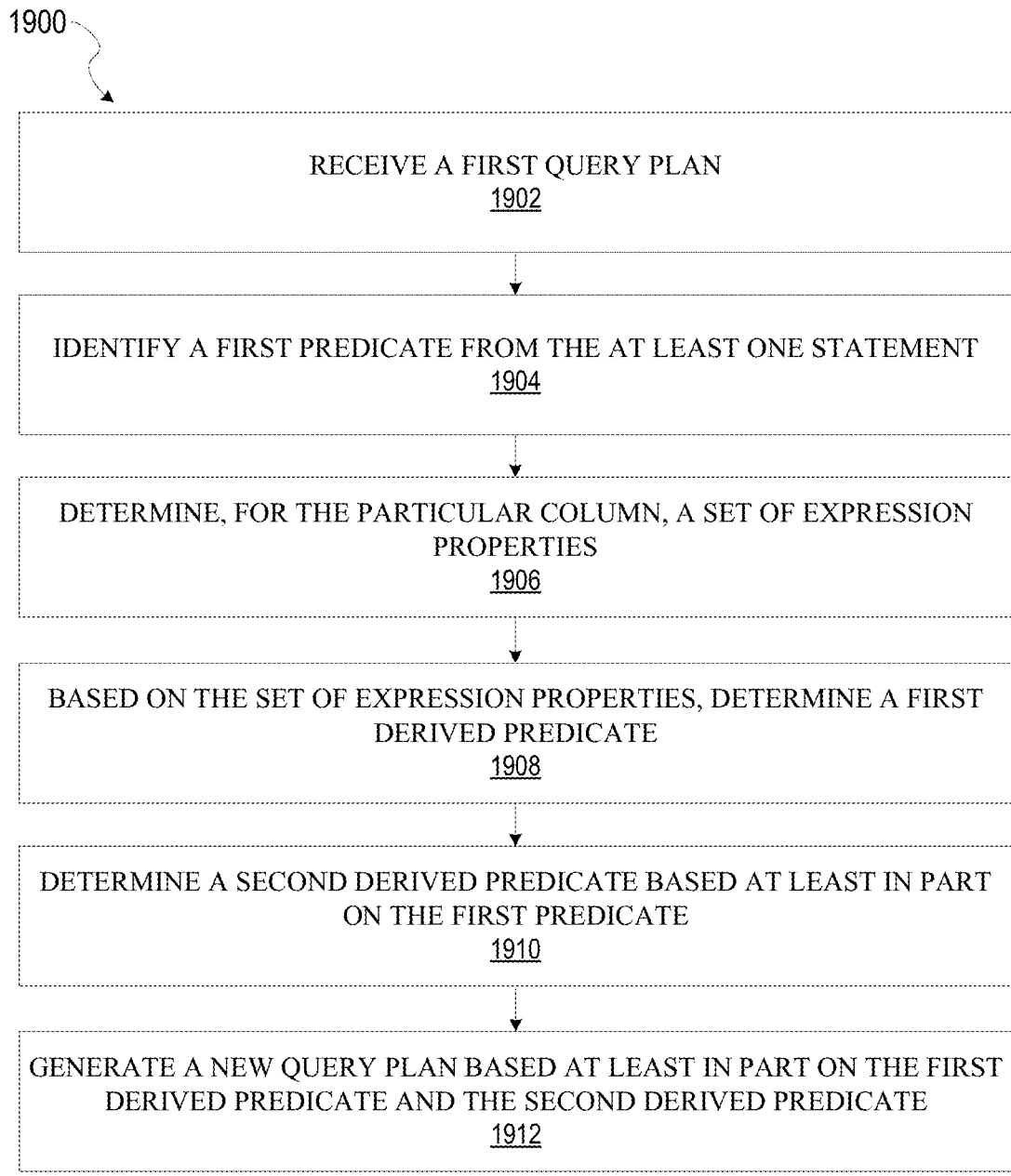
FIG. 19 is a flow diagram illustrating operations of a predicate derivation engine in performing a method for deriving a predicate, in accordance with some embodiments of the present disclosure.

An example method for predicate derivation is shown in FIG. 19 and discussed below.

FIG. 19 is a flow diagram illustrating operations of a predicate derivation engine in performing a method 1900 for deriving a predicate, in accordance with some embodiments of the present disclosure. The method 1900 may be embodied in computer-readable instructions for execution by one or more hardware components (e.g., one or more processors) such that the operations of the method 1900 may be performed by components of resource manager 1302 or processing platform 1300. Accordingly, the method 1900 is described below, by way of example with reference thereto. However, it shall be appreciated that the method 1900 may be deployed on various other hardware configurations and is not intended to be limited to deployment within the processing platform 1300.

At operation 1902, predicate derivation engine 1430 receives a first query plan, the first query plan including a set of statements, the set of statements including at least one statement with at least a reference to a particular column in a first table.

In an example, the at least one statement includes a second reference to a second column in a second table. Moreover, the first predicate corresponds to a join operation from the at least one statement, the join operation combining values from the particular column in the first table and the second column in the second table based at least in part on the first predicate.

In an example, the set of expression properties includes a minimum value and a maximum value of a set of values from the particular column, and determining the first derived predicate includes that predicate derivation engine 1430 determines a particular maximum value from the second column in the second table based on the maximum value of the set of values from the particular column in the first table.

In an example, the set of expression properties includes a minimum value and a maximum value of a set of values from the particular column, and determining the first derived predicate that predicate derivation engine 1430 determines a range of values based on the minimum value and the maximum value of the set of values from the particular column.

At operation 1904, predicate derivation engine 1430 identifies a first predicate from the at least one statement.

At operation 1906, predicate derivation engine 1430 determines, for the particular column, a set of expression properties.

At operation 1908, predicate derivation engine 1430 based on the set of expression properties, determines a first derived predicate.

At operation 1910, predicate derivation engine 1430 determines a second derived predicate based at least in part on the first predicate.

At operation 1912, predicate derivation engine 1430 generates a new query plan based at least in part on the first derived predicate and the second derived predicate.

In an embodiment, generating the new query plan further includes that predicate derivation engine 1430 determines a third derived predicate based at least in part on the first derived predicate, the new query plan being based on the first derived predicate, the second derived predicate, and the third derived predicate.

In an embodiment, predicate derivation engine 1430 determines a cardinality estimation of the first query plan, the determining including that predicate derivation engine 1430 determines that the first derived predicate is independent from the first predicate; determines a first selectivity value of the first predicate; determines a second selectivity value of the first derived predicate; and determines a value of the cardinality estimation based at least in part on a product between the first selectivity value and the second selectivity value.

In an embodiment, predicate derivation engine 1430 determines a cardinality estimation of the first query plan, the determining including that predicate derivation engine 1430 determines that the first derived predicate is dependent on the first predicate; determines a first selectivity value of the first predicate; determines a second selectivity value of the first derived predicate; and determines a value of the cardinality estimation based at least in part on determining a minimum selectivity value among the first selectivity value and the second selectivity value.

In an embodiment, predicate derivation engine 1430 determines an error associated with executing a particular operation based on the first derived predicate; and in response to the error, provides a true value as a result of executing the particular operation based on the first derived predicate.

In an embodiment, predicate derivation engine 1430 determines that a secure view is to be provided based on a result of executing a particular operation and the first predicate; pushes down the first derived predicate instead of the first predicate into the new query plan; pulls up a particular predicate from the secure view as a particular derived predicate, instead of the particular predicate, into the new query plan; and provides the secure view based on the first derived predicate and the particular predicate.

Figure 20:
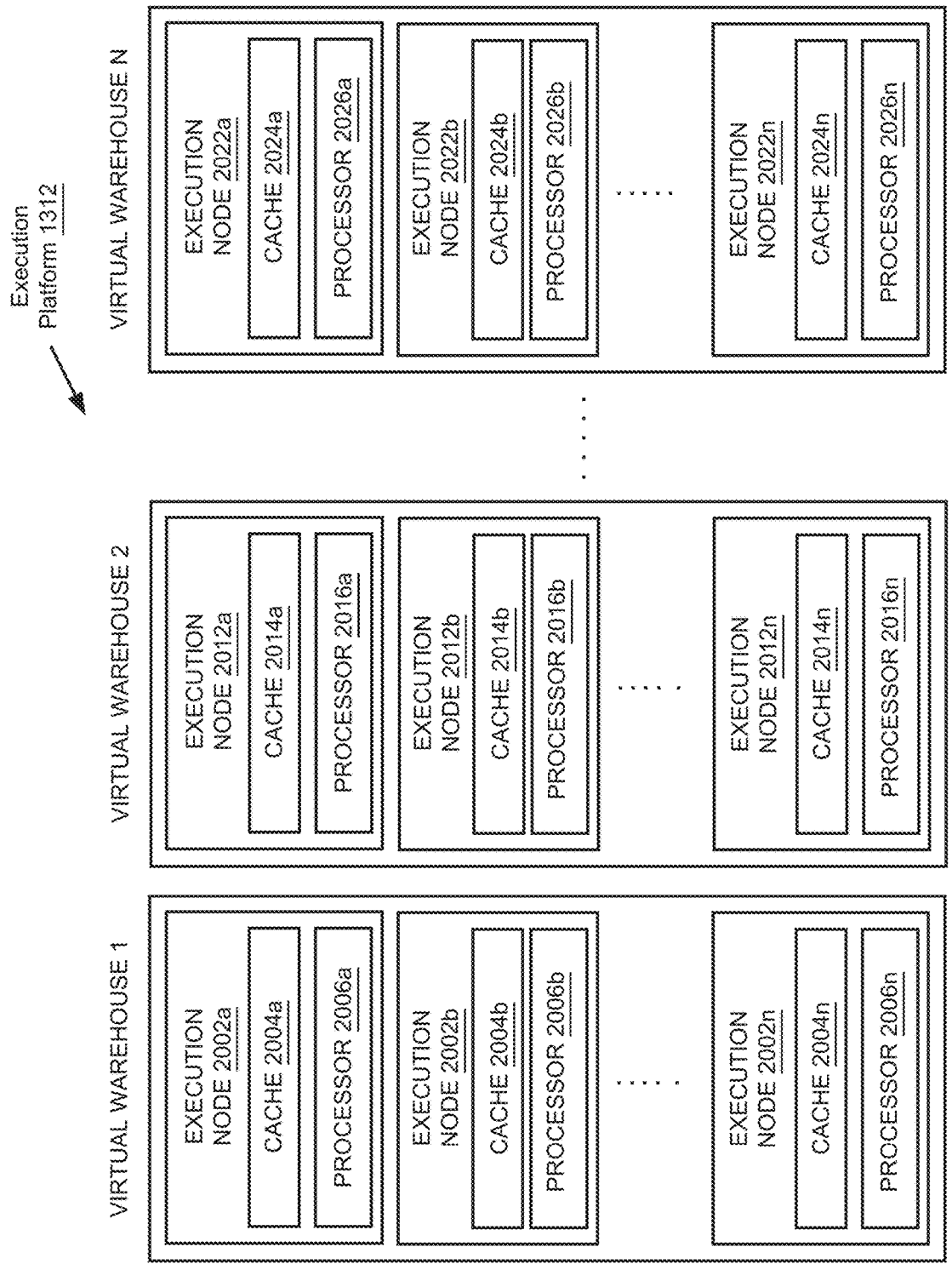
FIG. 20 is a schematic block diagram of an execution platform, according to an example embodiment of the systems and methods described herein.

FIG. 20 is a block diagram depicting an embodiment of an execution platform 1312. As shown in FIG. 20, execution platform 1312 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 1312 can add new virtual warehouses and drop existing virtual warehouses in real-time based on the current processing needs of the systems and users. This flexibility allows the execution platform 1312 to quickly deploy large amounts of computing resources when needed without being forced to continue paying for those computing resources when they are no longer needed. All virtual warehouses can access data from any data storage device (e.g., any storage device in shared database storage such as the storage platform 1314). Although each virtual warehouse shown in FIG. 20 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1316-1320 shown in FIG. 13. Thus, the virtual warehouses are not necessarily assigned to a specific data storage device and, instead, can access data from any of the data storage devices 1316-1320 within the storage platform 1314. Similarly, each of the execution nodes shown in FIG. 20 can access data from any of the data storage devices 1316-1320. In some embodiments, a particular virtual warehouse or a particular execution node may be temporarily assigned to a specific data storage device, but the virtual warehouse or execution node may later access data from any other data storage device.

In the example of FIG. 20, virtual warehouse 1 includes three execution nodes 2002a, 2002b, and 2002n. Execution node 2002a includes a cache 2004a and a processor 2006a. Execution node 2002b includes a cache 2004b and a processor 2006b. Execution node 2002n includes a cache 2004n and a processor 2006n. Each execution node 2002a, 2002b, and 2002n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 2012a, 2012b, and 2012n. Execution node 2012a includes a cache 2014a and a processor 2016a. Execution node 2012b includes a cache 2014b and a processor 2016b. Execution node 2012n includes a cache 2014n and a processor 2016n. Additionally, virtual warehouse 3 includes three execution nodes 2022a, 2022b, and 2022n. Execution node 2022a includes a cache 2024a and a processor 2026a. Execution node 2022b includes a cache 2024b and a processor 2026b. Execution node 2022n includes a cache 2024n and a processor 2026n.

In some embodiments, the execution nodes shown in FIG. 20 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 20 each include one data cache and one processor, alternate embodiments may include execution nodes containing any number of processors and any number of caches. Additionally, the caches may vary in size among the different execution nodes. The caches shown in FIG. 20 store, in the local execution node, data that was retrieved from one or more data storage devices in shared database storage. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the shared database storage of the storage platform 1314.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 1312, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 20 as having multiple execution nodes. The multiple execution nodes associated with each virtual warehouse may be implemented using multiple computing systems at multiple geographic locations. For example, an instance of virtual warehouse 1 implements execution nodes 2002a and 2002b on one computing platform at a geographic location and implements execution node 2002n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 1312 is also fault tolerant. For example, if one virtual warehouse fails, that virtual warehouse is quickly replaced with a different virtual warehouse at a different geographic location.

A particular execution platform 1312 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the shared database storage of the storage platform 1314 but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 21:
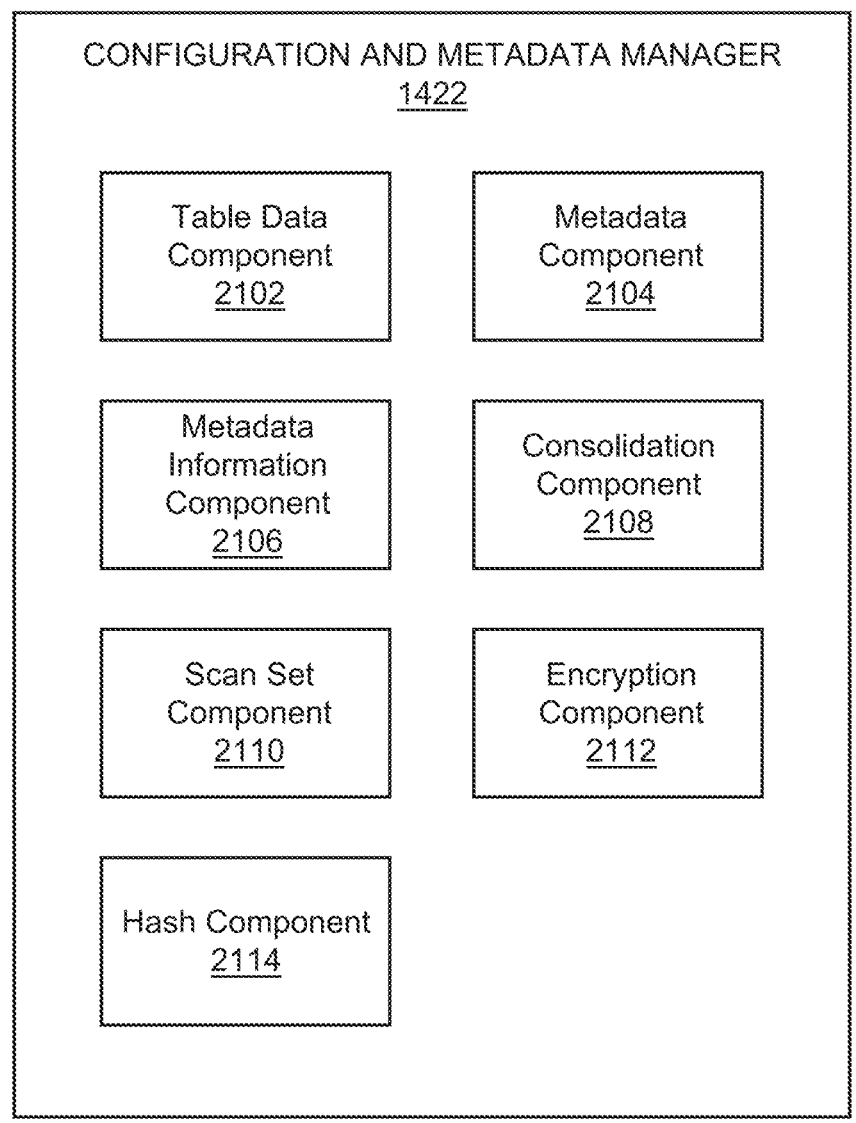
FIG. 21 is a schematic block diagram depicting components of a configuration and metadata manager, according to an example embodiment of the systems and methods described herein.

FIG. 21 is a schematic block diagram illustrating components of a configuration and metadata manager 1422, according to one embodiment. The configuration and metadata manager 1422 may collect, store, and manage metadata about table data micro-partitions as well as metadata about metadata micro-partitions. Such metadata may include cumulative table metadata, grouping expression properties, micro-partition expression properties (may also be referred to as file statistics), column expression properties, and so forth as disclosed herein. The configuration and metadata manager 1422 includes a table data component 2102, a metadata component 2104, a metadata information component 2106, a consolidation component 2108, a scan set component 2110, an encryption component 2112, and a hash component 2114. The components 2102-2114 are given by way of illustration only and may not all be included in all embodiments. In fact, some embodiments may include only one or any combination of two or more of the components 2102-2114. For example, some of the components may be located outside or separate from the configuration and metadata manager 1422, such as within a resource manager 1302 or processing platform 1300. Furthermore, the components 2102-2114 may comprise hardware, computer readable instructions, or a combination of both to perform the functionality and provide the structures discussed herein.

The table data component 2102 stores table data for a database, the table data includes information in rows and columns of one or more database tables. The table data component 2102 may store table data in table data micro-partitions within a storage resource. Example storage resources include cloud storage and/or immutable storage. In one embodiment, the storage resources for storage of table data micro-partitions may be dynamically allocated to accommodate increases or decreases in storage requirement. The table data component 2102 may manage and store table data by causing the data to be stored or updated in a remote resource, such as a cloud storage resource or service.

The metadata component 2104 stores metadata on immutable storage. The metadata may include information about or describing the table data for the database stored by the table data component 2102. In one embodiment, the metadata micro-partitions may include metadata such as an indication of added or deleted table data micro-partitions. The metadata may include micro-partition information for table data micro-partitions, the micro-partition information including one or more of a micro-partition name and a storage location. In one embodiment, the metadata may be stored in micro-partitions on the same cloud storage resources as the table data. In one embodiment, metadata component 2104 may cause the metadata to be stored within metadata micro-partitions in a column-by-column format in remote cloud storage.

The metadata component 2104 may also collect and manage storage of metadata within metadata micro-partitions on the immutable storage. The metadata component 2104 may create, in response to a change in the table data, a new metadata micro-partition in the immutable storage without modifying previous metadata micro-partitions. The new metadata micro-partition may include metadata indicating the change in the table data. In one embodiment, the metadata in the new metadata micro-partition indicates an addition or a deletion of a table data micro-partition comprising the table data. The metadata component 2104 may also delete expired metadata micro-partitions. Expired metadata micro-partitions may include those older than a specific age and that are not referenced in metadata information stored by the metadata information component 2106.

The metadata information component 2106 stores and manages information about the metadata in mutable storage. The information about the metadata (metadata about metadata micro-partitions) may be stored in local mutable storage and/or in metadata storage (or what was previously referenced as metadata storage. In one embodiment, however, the information about the metadata only includes information about metadata micro-partitions, not metadata about table data micro-partitions. Thus, all table data metadata may be located in immutable storage. In one embodiment, the information about metadata may be stored and updated in place. For example, the information about the metadata, in one embodiment, is stored in a key-value store. The information about the metadata includes information indicating a version and indicating one or more metadata micro-partitions that included metadata corresponding to the version.

The consolidation component 2108 consolidates or compacts metadata from two or more old metadata micro-partitions into a consolidated metadata micro-partition. In one embodiment, the consolidated metadata micro-partition includes metadata reflecting the table data changes indicated in the two or more old metadata micro-partitions. In one embodiment, the consolidation component 2108 deletes the two or more old metadata micro-partitions. The consolidation component 2108 may delete one or more table data micro-partitions not referenced by metadata in the consolidated metadata micro-partition.

The scan set component 2110 may compute a scan set for a query. In one embodiment, a database system may receive a query directed to a database that includes the table data. The scan set component may retrieve a plurality of uncached metadata micro-partitions or cause another component to do so. The metadata micro-partitions may include metadata micro-partitions that correspond to the query. In one embodiment, the scan set component downloads the metadata micro-partitions in parallel from the immutable storage. In one embodiment, the scan set component determines the scan set by reading a first metadata micro-partition before a second metadata micro-partition has been fully downloaded. This may allow for improved speed in computing scan sets because the processing and downloading of metadata can be done micro-partition by micro-partition or in chunks. Thus, a database system does not need to wait for all micro-partitions to download before it starts computing the scan set, it can compute the scan set as the metadata micro-partitions are retrieved (either from cache or from immutable storage). In one embodiment, the scan set indicates one or more table data micro-partitions needed to perform the query.

The encryption component 2112 is configured to encrypt table data and metadata. In one embodiment, the encryption component 2112 encrypts the metadata column-by-column to allow for independent decryption and reading of metadata for a specific column.

The hash component 2114 computes and stores hashes for columns. For example, upon creating a metadata micro-partition, the hash component 2114 may compute a hash for each column in the metadata micro-partition and store the hash. Later, when a column in the micro-partition is accessed, the hash component 2114 may compute the hash and compare it to the stored hash. If the hashes are different, the hash component 2114 may determine that the metadata in that column has been altered.

Figure 22:
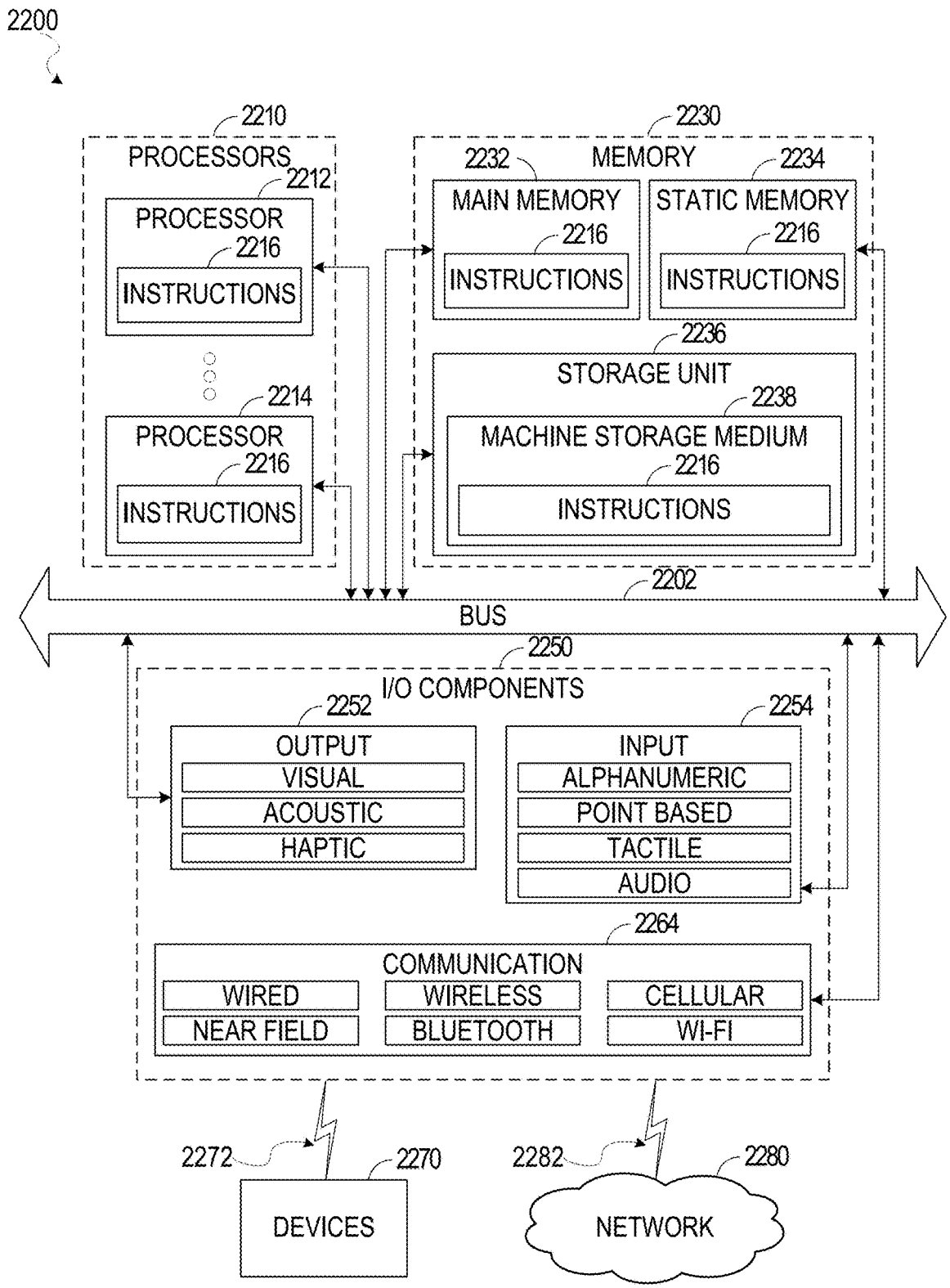
FIG. 22 illustrates a diagrammatic representation of a machine in the form of a computer system within which a set of instructions may be executed for causing the machine to perform any one or more of the methodologies discussed herein, according to an example embodiment.

FIG. 22 illustrates a diagrammatic representation of a machine 2200 in the form of a computer system within which a set of instructions may be executed for causing the machine 2200 to perform any one or more of the methodologies discussed herein, according to an example embodiment. Specifically, FIG. 22 shows a diagrammatic representation of the machine 2200 in the example form of a computer system, within which instructions 2216 (e.g., software, a program, an application, an applet, an app, or other executable code) for causing the machine 2200 to perform any one or more of the methodologies discussed herein may be executed. For example, the instructions 2216 may cause the machine 2200 to execute any one or more operations of method 1900. As another example, the instructions 2216 may cause the machine 2200 to implement portions of the data flows illustrated in at least FIG. 4A, FIG. 4B, FIG. 8, and FIG. 9. For example, machine 2200 may include or be part of a configuration and metadata manager 1422, a resource manager 1302, a processing platform 1300, and/or any other components or systems discussed herein. In this way, the instructions 2216 transform a general, non-programmed machine into a particular machine 2200 that is specially configured to carry out any one of the described and illustrated functions in the manner described herein.

In alternative embodiments, the machine 2200 operates as a standalone device or may be coupled (e.g., networked) to other machines. In a networked deployment, the machine 2200 may operate in the capacity of a server machine or a client machine in a server-client network environment, or as a peer machine in a peer-to-peer (or distributed) network environment. The machine 2200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 2216, sequentially or otherwise, that specify actions to be taken by the machine 2200. Further, while only a single machine 2200 is illustrated, the term "machine" shall also be taken to include a collection of machines 2200 that individually or jointly execute the instructions 2216 to perform any one or more of the methodologies discussed herein.

The machine 2200 includes processors 2210, memory 2230, and input/output (I/O) components 2250 configured to communicate with each other such as via a bus 2202. In an example embodiment, the processors 2210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2212 and a processor 2214 that may execute the instructions 2216. The term "processor" is intended to include multi-core processors 2210 that may comprise two or more independent processors (sometimes referred to as "cores") that may execute instructions 2216 contemporaneously. Although FIG. 22 shows multiple processors 2210, the machine 2200 may include a single processor with a single core, a single processor with multiple cores (e.g., a multi-core processor), multiple processors with a single core, multiple processors with multiple cores, or any combination thereof.

The memory 2230 may include a main memory 2232, a static memory 2234, and a storage unit 2236, all accessible to the processors 2210 such as via the bus 2202. The main memory 2232, the static memory 2234, and the storage unit 2236 store the instructions 2216 embodying any one or more of the methodologies or functions described herein. The instructions 2216 may also reside, completely or partially, within the main memory 2232, within the static memory 2234, within machine storage medium 2238 of the storage unit 2236, within at least one of the processors 2210 (e.g., within the processor's cache memory), or any suitable combination thereof, during execution thereof by the machine 2200.

The I/O components 2250 include components to receive input, provide output, produce output, transmit information, exchange information, capture measurements, and so on. The specific I/O components 2250 that are included in a particular machine 2200 will depend on the type of machine. For example, portable machines such as mobile phones will likely include a touch input device or other such input mechanisms, while a headless server machine will likely not include such a touch input device. It will be appreciated that the I/O components 2250 may include many other components that are not shown in FIG. 22. The I/O components 2250 are grouped according to functionality merely for simplifying the following discussion and the grouping is in no way limiting. In various example embodiments, the I/O components 2250 may include output components 2252 and input components 2254. The output components 2252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 2254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 2250 may include communication components 2264 operable to couple the machine 2200 to a network 2280 or devices 2270 via a coupling 2282 and a coupling 2272, respectively. For example, the communication components 2264 may include a network interface component or another suitable device to interface with the network 2280. In further examples, the communication components 2264 may include wired communication components, wireless communication components, cellular communication components, and other communication components to provide communication via other modalities. The devices 2270 may be another machine or any of a wide variety of peripheral devices (e.g., a peripheral device coupled via a universal serial bus (USB)). For example, as noted above, the machine 2200 may correspond to any other computing device described herein.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

CONCLUSION

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the term or phrase.

It is further noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

Many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays (FPGAs), programmable array logic, programmable logic devices, and/or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A system comprising:
   at least one processor; and
   a memory device including instructions, which when executed by the at least one processor, cause the at least one processor to perform operations comprising:
   receiving a first query plan, the first query plan including a set of statements, the set of statements including at least one statement with at least a reference to a particular column in a first table;

identifying a first predicate from the at least one statement, the first predicate corresponding to a join operation;
determining, for the particular column, a set of expression properties;
based on the set of expression properties, determining a first derived predicate, the first derived predicate corresponding to a first filter operation;
determining a second derived predicate based at least in part on the first predicate, the second derived predicate corresponding to a second filter operation that is derived based on analyzing the first derived predicate and the set of expression properties;
generating a new operation based on the second derived predicate; and
generating a new query plan based at least in part on the join operation of first predicate, the first derived predicate, and the new operation of the second derived predicate, the new query plan comprising a tree structure with a plurality of nodes,
the new operation, comprising the second filter operation, being included as a first particular node below a second particular node corresponding to the join operation in the tree structure of the new query plan, the first filter operation being included as a third node below the second particular node corresponding to the join operation in the tree structure of the new query plan, and the new operation of the second derived predicate facilitating removing data prior to performing the join operation and thereby reducing utilization of computing resources when executing the new query plan.

2. The system of claim 1, wherein the operations further comprise:
sending the new query plan to an execution node for executing a particular query corresponding to the new query plan.

3. The system of claim 1, wherein the operations further comprise:
receiving a second query plan, the second query plan including a particular set of statements, the particular set of statements including at least one particular statement with at least a particular reference to a first particular column in a first particular table and a second particular column in a second particular table;
identifying a first particular predicate from the at least one particular statement, the first particular predicate corresponding to a particular join operation;
determining, for the first particular column, a particular set of expression properties;
based on the particular set of expression properties, determining a first particular derived predicate, the first particular derived predicate indicating that a set of values from the first particular column are not null;
generating a particular new operation based on the first particular derived predicate, the particular new operation comprising a filter operation for filtering null values from the set of values from the first particular column; and
generating a particular new query plan based at least in part on the particular join operation of first particular predicate, the first particular derived predicate, and the particular new operation of the first particular derived predicate.

4. The system of claim 3, wherein the at least one statement includes a second reference to a second column in a second table, and the join operation combines values from the particular column in the first table and the second column in the second table based at least in part on the first predicate.

5. The system of claim 4, wherein the set of expression properties includes a minimum value and a maximum value of a set of values from the particular column, and determining the first derived predicate comprises:
determining a particular maximum value from the second column in the second table based on the maximum value of the set of values from the particular column in the first table.

6. The system of claim 4, wherein the set of expression properties includes a minimum value and a maximum value of a set of values from the particular column, and determining the first derived predicate comprises:
determining a range of values based on the minimum value and the maximum value of the set of values from the particular column.

7. The system of claim 1, wherein the operations further comprise:
determining a cardinality estimation of the first query plan, the determining comprising:
determining that the first derived predicate is independent from the first predicate;
determining a first selectivity value of the first predicate;
determining a second selectivity value of the first derived predicate; and
determining a value of the cardinality estimation based at least in part on a product between the first selectivity value and the second selectivity value.

8. The system of claim 1, wherein the operations further comprise:
determining a cardinality estimation of the first query plan, the determining comprising:
determining that the first derived predicate is dependent on the first predicate;
determining a first selectivity value of the first predicate;
determining a second selectivity value of the first derived predicate; and
determining a value of the cardinality estimation based at least in part on determining a minimum selectivity value among the first selectivity value and the second selectivity value.

9. The system of claim 1, wherein the operations further comprise:
determining an error associated with executing a particular operation based on the first derived predicate; and
in response to the error, providing a true value as a result of executing the particular operation based on the first derived predicate.

10. The system of claim 1, wherein the operations further comprise:
determining that a secure view is to be provided based on a result of executing a particular operation and the first predicate;
pushing down the first derived predicate instead of the first predicate into the new query plan;
pulling up a particular predicate from the secure view as a particular derived predicate, instead of the particular predicate, into the new query plan; and
providing the secure view based on the first derived predicate and the particular predicate.

11. A method comprising:
receiving a first query plan, the first query plan including a set of statements, the set of statements including at least one statement with at least a reference to a particular column in a first table;

identifying a first predicate from the at least one statement, the first predicate corresponding to a join operation;

determining, for the particular column, a set of expression properties;

based on the set of expression properties, determining a first derived predicate, the first derived predicate corresponding to a first filter operation;

determining a second derived predicate based at least in part on the first predicate, the second derived predicate corresponding to a second filter operation that is derived based on analyzing the first derived predicate and the set of expression properties;

generating a new operation based on the second derived predicate; and generating a new query plan based at least in part on the join operation of first predicate, the first derived predicate, and the new operation of the second derived predicate, the new query plan comprising a tree structure with a plurality of nodes, the new operation, comprising the second filter operation, being included as a first particular node below a second particular node corresponding to the join operation in the tree structure of the new query plan, the first filter operation being included as a third node below the second particular node corresponding to the join operation in the tree structure of the new query plan, and the new operation of the second derived predicate facilitating removing data prior to performing the join operation and thereby reducing utilization of computing resources when executing the new query plan.

12. The method of claim 11, wherein generating the new query plan further comprises:
determining a third derived predicate based at least in part on the first derived predicate, the new query plan being based on the first derived predicate, the second derived predicate, and the third derived predicate.

13. The method of claim 11, wherein the at least one statement includes a second reference to a second column in a second table.

14. The method of claim 13, wherein the join operation combines values from the particular column in the first table and the second column in the second table based at least in part on the first predicate.

15. The method of claim 14, wherein the set of expression properties includes a minimum value and a maximum value of a set of values from the particular column, and determining the first derived predicate comprises:
determining a particular maximum value from the second column in the second table based on the maximum value of the set of values from the particular column in the first table.

16. The method of claim 14, wherein the set of expression properties includes a minimum value and a maximum value of a set of values from the particular column, and determining the first derived predicate comprises:
determining a range of values based on the minimum value and the maximum value of the set of values from the particular column.

17. The method of claim 11, further comprising:
determining a cardinality estimation of the first query plan, the determining comprising:
determining that the first derived predicate is independent from the first predicate;
determining a first selectivity value of the first predicate;
determining a second selectivity value of the first derived predicate; and
determining a value of the cardinality estimation based at least in part on a product between the first selectivity value and the second selectivity value.

18. The method of claim 11, further comprising:
determining a cardinality estimation of the first query plan, the determining comprising:
determining that the first derived predicate is dependent on the first predicate;
determining a first selectivity value of the first predicate;
determining a second selectivity value of the first derived predicate; and
determining a value of the cardinality estimation based at least in part on determining a minimum selectivity value among the first selectivity value and the second selectivity value.

19. The method of claim 11, further comprising:
determining an error associated with executing a particular operation based on the first derived predicate; and
in response to the error, providing a true value as a result of executing the particular operation based on the first derived predicate.

20. The method of claim 11, further comprising:
determining that a secure view is to be provided based on a result of executing a particular operation and the first predicate;
pushing down the first derived predicate instead of the first predicate into the new query plan;
pulling up a particular predicate from the secure view as a particular derived predicate, instead of the particular predicate, into the new query plan; and
providing the secure view based on the first derived predicate and the particular predicate.

21. A non-transitory computer-readable medium comprising instructions that, when executed by at least one processor, configure the at least one processor to perform operations comprising:
receiving a first query plan, the first query plan including a set of statements, the set of statements including at least one statement with at least a reference to a particular column in a first table;
identifying a first predicate from the at least one statement, the first predicate corresponding to a join operation, the first derived predicate corresponding to a first filter operation;
determining, for the particular column, a set of expression properties;
based on the set of expression properties, determining a first derived predicate;
determining a second derived predicate based at least in part on the first predicate, the second derived predicate corresponding to a second filter operation that is derived based on analyzing the first derived predicate and the set of expression properties;
generating a new operation based on the second derived predicate; and
generating a new query plan based at least in part on the join operation of first predicate, the first derived predicate, and the new operation of the second derived predicate, the new query plan comprising a tree structure with a plurality of nodes,
the new operation, comprising the second filter operation, being included as a first particular node below a second particular node corresponding to the join operation in the tree structure of the new query plan, the first filter operation being included as a third node below the second particular node corresponding to the join operation in the tree structure of the new query plan, and the new operation of the second derived predicate facilitating removing data prior to performing the join operation and thereby reducing utilization of computing resources when executing the new query plan.

22. The non-transitory computer-readable medium of claim 21, wherein generating the new query plan further comprises:
   determining a third derived predicate based at least in part on the first derived predicate, the new query plan being based on the first derived predicate, the second derived predicate, and the third derived predicate.

23. The non-transitory computer-readable medium of claim 21, wherein the at least one statement includes a second reference to a second column in a second table.

24. The non-transitory computer-readable medium of claim 23, wherein the join operation combines values from the particular column in the first table and the second column in the second table based at least in part on the first predicate.

25. The non-transitory computer-readable medium of claim 24, wherein the set of expression properties includes a minimum value and a maximum value of a set of values from the particular column, and determining the first derived predicate comprises:
   determining a particular maximum value from the second column in the second table based on the maximum value of the set of values from the particular column in the first table.

26. The non-transitory computer-readable medium of claim 24, wherein the set of expression properties includes a minimum value and a maximum value of a set of values from the particular column, and determining the first derived predicate comprises:
   determining a range of values based on the minimum value and the maximum value of the set of values from the particular column.

27. The non-transitory computer-readable medium of claim 21, wherein the operations further comprise:
   determining a cardinality estimation of the first query plan, the determining comprising:
   determining that the first derived predicate is independent from the first predicate;
   determining a first selectivity value of the first predicate;
   determining a second selectivity value of the first derived predicate; and
   determining a value of the cardinality estimation based at least in part on a product between the first selectivity value and the second selectivity value.

28. The non-transitory computer-readable medium of claim 21, wherein the operations further comprise:
   determining a cardinality estimation of the first query plan, the determining comprising:
   determining that the first derived predicate is dependent on the first predicate;
   determining a first selectivity value of the first predicate;
   determining a second selectivity value of the first derived predicate; and
   determining a value of the cardinality estimation based at least in part on determining a minimum selectivity value among the first selectivity value and the second selectivity value.

29. The non-transitory computer-readable medium of claim 21, wherein the operations further comprise:
   determining an error associated with executing a particular operation based on the first derived predicate; and
   in response to the error, providing a true value as a result of executing the particular operation based on the first derived predicate.

30. The non-transitory computer-readable medium of claim 21, wherein the operations further comprise:
   determining that a secure view is to be provided based on a result of executing a particular operation and the first predicate;
   pushing down the first derived predicate instead of the first predicate into the new query plan;
   pulling up a particular predicate from the secure view as a particular derived predicate, instead of the particular predicate, into the new query plan; and
   providing the secure view based on the first derived predicate and the particular predicate.

* * * * *